US010866868B2

(12) United States Patent
Horowitz

(10) Patent No.: US 10,866,868 B2
(45) Date of Patent: Dec. 15, 2020

(54) SYSTEMS AND METHODS FOR OPTIMIZATION OF DATABASE OPERATIONS

(71) Applicant: MongoDB, Inc., New York, NY (US)

(72) Inventor: Eliot Horowitz, New York, NY (US)

(73) Assignee: MongoDB, Inc., New York, NY (US)

(*) Notice: Subject to any disclaimer, the term of this patent is extended or adjusted under 35 U.S.C. 154(b) by 186 days.

(21) Appl. No.: 16/013,345

(22) Filed: Jun. 20, 2018

(65) Prior Publication Data
US 2018/0365114 A1    Dec. 20, 2018

Related U.S. Application Data

(60) Provisional application No. 62/522,540, filed on Jun. 20, 2017, provisional application No. 62/522,150, filed on Jun. 20, 2017.

(51) Int. Cl.
G06F 11/00 (2006.01)
G06F 11/14 (2006.01)
G06F 16/21 (2019.01)
G06F 16/23 (2019.01)
G06F 11/20 (2006.01)

(52) U.S. Cl.
CPC ...... *G06F 11/1474* (2013.01); *G06F 11/1451* (2013.01); *G06F 11/2094* (2013.01); *G06F 11/2097* (2013.01); *G06F 16/213* (2019.01); *G06F 16/2365* (2019.01); G06F 11/1443 (2013.01); G06F 2201/80 (2013.01); G06F 2201/82 (2013.01); G06F 2201/855 (2013.01)

(58) Field of Classification Search
CPC ............ G06F 11/1402; G06F 11/1443; G06F 11/1451; G06F 11/1474; G06F 11/2094; G06F 11/2097; G06F 16/213; G06F 16/2365; G06F 2201/80; G06F 2201/82; G06F 2201/855
See application file for complete search history.

(56) References Cited

U.S. PATENT DOCUMENTS

| 4,918,593 A | 4/1990 | Huber |
| 5,379,419 A | 1/1995 | Heffernan et al. |
| 5,416,917 A | 5/1995 | Adair et al. |

(Continued)

OTHER PUBLICATIONS

Ongaro et al., In Search of an Understandable Consensus Algorithm. Proceedings of USENIX ATC '14: 2014 USENIX Annual Technical Conference. Philadelphia, PA. Jun. 19-20, 2014; pp. 305-320.

(Continued)

*Primary Examiner* — Marc Duncan
(74) *Attorney, Agent, or Firm* — Wolf, Greenfield & Sacks, P.C.

(57) ABSTRACT

In various embodiments, the system includes augmented database drivers that are configured to automatically retry execution of write operations if a failure is encountered. In some embodiments, a database daemon is configured to manage the database functionality for a respective database node (e.g., primary or secondary node). Retrying execution of write operations allows the drivers to automatically retry certain write operations a threshold number of times if, for example, a network error is encountered, or if a healthy primary node is not available.

20 Claims, 7 Drawing Sheets

(56) References Cited

U.S. PATENT DOCUMENTS

| | | |
|---|---|---|
| 5,471,629 A | 11/1995 | Risch |
| 5,551,027 A | 8/1996 | Choy et al. |
| 5,598,559 A | 1/1997 | Chaudhuri |
| 5,710,915 A | 1/1998 | McElhiney |
| 5,884,299 A | 3/1999 | Ramesh et al. |
| 5,999,179 A | 12/1999 | Kekic et al. |
| 6,065,017 A | 5/2000 | Barker |
| 6,088,524 A | 7/2000 | Levy et al. |
| 6,112,201 A | 8/2000 | Wical |
| 6,115,705 A | 9/2000 | Larson |
| 6,240,406 B1 | 5/2001 | Tannen |
| 6,240,514 B1 | 5/2001 | Inoue et al. |
| 6,249,866 B1 | 6/2001 | Brundrett et al. |
| 6,324,540 B1 | 11/2001 | Khanna et al. |
| 6,324,654 B1 | 11/2001 | Wahl et al. |
| 6,339,770 B1 | 1/2002 | Leung et al. |
| 6,351,742 B1 | 2/2002 | Agarwal et al. |
| 6,363,389 B1 | 3/2002 | Lyle et al. |
| 6,385,201 B1 | 5/2002 | Iwata |
| 6,385,604 B1 | 5/2002 | Bakalash et al. |
| 6,496,843 B1 | 12/2002 | Getchius et al. |
| 6,505,187 B1 | 1/2003 | Shatdal |
| 6,611,850 B1 | 8/2003 | Shen |
| 6,687,846 B1 | 2/2004 | Adrangi et al. |
| 6,691,101 B2 | 2/2004 | MacNicol et al. |
| 6,801,905 B2 | 10/2004 | Andrei |
| 6,823,474 B2 | 11/2004 | Kampe et al. |
| 6,920,460 B1 | 7/2005 | Srinivasan et al. |
| 6,959,369 B1 | 10/2005 | Ashton et al. |
| 7,020,649 B2 | 3/2006 | Cochrane et al. |
| 7,032,089 B1 | 4/2006 | Ranade et al. |
| 7,082,473 B2 | 7/2006 | Breitbart et al. |
| 7,177,866 B2 | 2/2007 | Holenstein et al. |
| 7,181,460 B2 | 2/2007 | Coss et al. |
| 7,191,299 B1 | 3/2007 | Kekre et al. |
| 7,246,345 B1 | 7/2007 | Sharma et al. |
| 7,447,807 B1 | 11/2008 | Merry et al. |
| 7,467,103 B1 | 12/2008 | Murray et al. |
| 7,469,253 B2 | 12/2008 | Celis et al. |
| 7,472,117 B2 | 12/2008 | Dettinger et al. |
| 7,486,661 B2 | 2/2009 | Van den Boeck et al. |
| 7,548,928 B1 | 6/2009 | Dean et al. |
| 7,552,356 B1 | 6/2009 | Waterhouse et al. |
| 7,558,481 B2 | 7/2009 | Jenkins et al. |
| 7,567,991 B2 | 7/2009 | Armangau et al. |
| 7,617,369 B1 | 11/2009 | Bezbaruah et al. |
| 7,634,459 B1 | 12/2009 | Eshet et al. |
| 7,647,329 B1 | 1/2010 | Fischman et al. |
| 7,657,570 B2 | 2/2010 | Wang et al. |
| 7,657,578 B2 | 2/2010 | Karr et al. |
| 7,668,801 B1 | 2/2010 | Koudas et al. |
| 7,761,465 B1 | 7/2010 | Nonaka et al. |
| 7,957,284 B2 | 6/2011 | Lu et al. |
| 7,962,458 B2 | 6/2011 | Holenstein et al. |
| 8,005,804 B2 | 8/2011 | Greer |
| 8,005,868 B2 | 8/2011 | Saborit et al. |
| 8,037,059 B2 | 10/2011 | Bestgen et al. |
| 8,078,825 B2 | 12/2011 | Oreland et al. |
| 8,082,265 B2 | 12/2011 | Carlson et al. |
| 8,086,597 B2 | 12/2011 | Balmin et al. |
| 8,099,572 B1 | 1/2012 | Arora et al. |
| 8,103,906 B1 | 1/2012 | Alibakhsh et al. |
| 8,108,443 B2 | 1/2012 | Thusoo |
| 8,126,848 B2 | 2/2012 | Wagner |
| 8,170,984 B2 | 5/2012 | Bakalash et al. |
| 8,260,840 B1 | 9/2012 | Sirota et al. |
| 8,296,419 B1 | 10/2012 | Khanna et al. |
| 8,305,999 B2 | 11/2012 | Palanki et al. |
| 8,321,558 B1 | 11/2012 | Sirota et al. |
| 8,352,450 B1 | 1/2013 | Mraz et al. |
| 8,352,463 B2 | 1/2013 | Nayak |
| 8,363,961 B1 | 1/2013 | Avidan et al. |
| 8,370,857 B2 | 2/2013 | Kamii et al. |
| 8,386,463 B2 | 2/2013 | Bestgen et al. |
| 8,392,482 B1 | 3/2013 | McAlister et al. |
| 8,539,197 B1 | 9/2013 | Marshall et al. |
| 8,572,031 B2 | 10/2013 | Merriman et al. |
| 8,589,382 B2 | 11/2013 | Betawadkar-Norwood |
| 8,589,574 B1 | 11/2013 | Cormie et al. |
| 8,615,507 B2 | 12/2013 | Varadarajulu et al. |
| 8,712,044 B2 | 4/2014 | MacMillan et al. |
| 8,712,993 B1 | 4/2014 | Ordonez |
| 8,751,533 B1 | 6/2014 | Dhavale et al. |
| 8,843,441 B1 | 9/2014 | Rath et al. |
| 8,869,256 B2 | 10/2014 | Sample |
| 8,996,463 B2 | 3/2015 | Merriman et al. |
| 9,015,431 B2 | 4/2015 | Resch et al. |
| 9,069,827 B1 | 6/2015 | Rath et al. |
| 9,116,862 B1 | 8/2015 | Rath et al. |
| 9,141,814 B1 | 9/2015 | Murray |
| 9,183,254 B1 | 11/2015 | Cole et al. |
| 9,262,462 B2 | 2/2016 | Merriman et al. |
| 9,268,639 B2 | 2/2016 | Leggette et al. |
| 9,274,902 B1 | 3/2016 | Morley et al. |
| 9,317,576 B2 | 4/2016 | Merriman et al. |
| 9,350,633 B2 | 5/2016 | Cudak et al. |
| 9,350,681 B1 | 5/2016 | Kitagawa et al. |
| 9,460,008 B1 | 10/2016 | Leshinsky et al. |
| 9,495,427 B2 | 11/2016 | Abadi et al. |
| 9,569,481 B1 | 2/2017 | Chandra et al. |
| 9,660,666 B1 | 5/2017 | Ciarlini et al. |
| 9,715,433 B2 * | 7/2017 | Mu ................ G06F 11/2069 |
| 9,740,762 B2 | 8/2017 | Horowitz et al. |
| 9,792,322 B2 | 10/2017 | Merriman et al. |
| 9,800,685 B2 * | 10/2017 | Neerincx ................ H04L 69/40 |
| 9,805,108 B2 | 10/2017 | Merriman et al. |
| 9,881,034 B2 | 1/2018 | Horowitz et al. |
| 9,959,308 B1 | 5/2018 | Carman et al. |
| 10,031,931 B2 | 7/2018 | Horowitz et al. |
| 10,031,956 B2 | 7/2018 | Merriman et al. |
| 10,262,050 B2 | 4/2019 | Bostic et al. |
| 10,303,570 B2 * | 5/2019 | Nakajima ........... G06F 11/2058 |
| 10,346,430 B2 | 7/2019 | Horowitz et al. |
| 10,346,434 B1 | 7/2019 | Morkel et al. |
| 10,366,100 B2 | 7/2019 | Horowitz et al. |
| 10,372,926 B1 | 8/2019 | Leshinsky et al. |
| 10,394,822 B2 | 8/2019 | Stearn |
| 10,423,626 B2 | 9/2019 | Stearn et al. |
| 10,430,433 B2 | 10/2019 | Stearn et al. |
| 10,474,645 B2 * | 11/2019 | Freedman ........... G06F 16/2322 |
| 10,489,357 B2 | 11/2019 | Horowitz et al. |
| 10,496,669 B2 | 12/2019 | Merriman et al. |
| 10,614,098 B2 | 4/2020 | Horowitz et al. |
| 10,621,050 B2 | 4/2020 | Horowitz et al. |
| 10,621,200 B2 | 4/2020 | Merriman et al. |
| 10,671,496 B2 | 6/2020 | Horowitz et al. |
| 10,673,623 B2 | 6/2020 | Horowitz et al. |
| 10,698,775 B2 | 6/2020 | Horowitz et al. |
| 10,713,275 B2 | 7/2020 | Merriman et al. |
| 10,713,280 B2 | 7/2020 | Horowitz et al. |
| 2001/0021929 A1 | 9/2001 | Lin et al. |
| 2002/0029207 A1 | 3/2002 | Bakalash et al. |
| 2002/0065675 A1 | 5/2002 | Grainger et al. |
| 2002/0065676 A1 | 5/2002 | Grainger et al. |
| 2002/0065677 A1 | 5/2002 | Grainger et al. |
| 2002/0143901 A1 | 10/2002 | Lupo et al. |
| 2002/0147842 A1 | 10/2002 | Breitbart et al. |
| 2002/0184239 A1 | 12/2002 | Mosher, Jr. et al. |
| 2003/0046307 A1 | 3/2003 | Rivette et al. |
| 2003/0212668 A1 | 4/2003 | Hinshaw et al. |
| 2003/0084073 A1 | 5/2003 | Hotti et al. |
| 2003/0088659 A1 | 5/2003 | Susarla et al. |
| 2003/0182427 A1 | 9/2003 | Halpern |
| 2003/0187864 A1 | 10/2003 | McGoveran |
| 2004/0078569 A1 | 4/2004 | Hotti |
| 2004/0133591 A1 | 7/2004 | Holenstein et al. |
| 2004/0168084 A1 | 8/2004 | Owen et al. |
| 2004/0186817 A1 | 9/2004 | Thames et al. |
| 2004/0186826 A1 | 9/2004 | Choi et al. |
| 2004/0205048 A1 | 10/2004 | Pizzo et al. |
| 2004/0236743 A1 | 11/2004 | Blaicher et al. |
| 2004/0254919 A1 | 12/2004 | Giuseppini |
| 2005/0027796 A1 | 2/2005 | San Andres et al. |
| 2005/0033756 A1 | 2/2005 | Kottomtharayil et al. |

(56) References Cited

U.S. PATENT DOCUMENTS

| | | |
|---|---|---|
| 2005/0038833 A1 | 2/2005 | Colrain et al. |
| 2005/0192921 A1 | 9/2005 | Chaudhuri et al. |
| 2005/0234841 A1 | 10/2005 | Miao et al. |
| 2005/0283457 A1 | 12/2005 | Sonkin et al. |
| 2006/0004746 A1 | 1/2006 | Angus et al. |
| 2006/0020586 A1 | 1/2006 | Prompt et al. |
| 2006/0085541 A1 | 4/2006 | Cuomo et al. |
| 2006/0090095 A1 | 4/2006 | Massa et al. |
| 2006/0168154 A1 | 7/2006 | Zhang et al. |
| 2006/0209782 A1 | 9/2006 | Miller et al. |
| 2006/0218123 A1 | 9/2006 | Chowdhuri et al. |
| 2006/0235905 A1 | 10/2006 | Kapur |
| 2006/0287998 A1 | 12/2006 | Folting et al. |
| 2006/0288232 A1 | 12/2006 | Ho et al. |
| 2006/0294129 A1 | 12/2006 | Stanfill et al. |
| 2007/0050436 A1 | 3/2007 | Chen et al. |
| 2007/0061487 A1 | 3/2007 | Moore et al. |
| 2007/0094237 A1 | 4/2007 | Mitchell et al. |
| 2007/0203944 A1 | 8/2007 | Batra et al. |
| 2007/0226640 A1 | 9/2007 | Holbrook et al. |
| 2007/0233746 A1 | 10/2007 | Garbow et al. |
| 2007/0240129 A1 | 10/2007 | Kretzschmar et al. |
| 2008/0002741 A1 | 1/2008 | Maheshwari et al. |
| 2008/0005475 A1 | 1/2008 | Lubbers et al. |
| 2008/0016021 A1 | 1/2008 | Gulbeden et al. |
| 2008/0071755 A1 | 3/2008 | Barsness et al. |
| 2008/0098041 A1 | 4/2008 | Chidambaran et al. |
| 2008/0140971 A1 | 6/2008 | Dankel et al. |
| 2008/0162590 A1 | 7/2008 | Kundu et al. |
| 2008/0288646 A1 | 11/2008 | Hasha et al. |
| 2009/0030986 A1 | 1/2009 | Bates |
| 2009/0055350 A1 | 2/2009 | Branish et al. |
| 2009/0077010 A1 | 3/2009 | Muras et al. |
| 2009/0094318 A1 | 4/2009 | Gladwin et al. |
| 2009/0222474 A1 | 9/2009 | Alpern et al. |
| 2009/0240744 A1 | 9/2009 | Thomson et al. |
| 2009/0271412 A1 | 10/2009 | Lacapra et al. |
| 2010/0011026 A1 | 1/2010 | Saha et al. |
| 2010/0030793 A1 | 2/2010 | Cooper et al. |
| 2010/0030800 A1 | 2/2010 | Brodfuehrer et al. |
| 2010/0049717 A1 | 2/2010 | Ryan et al. |
| 2010/0058010 A1 | 3/2010 | Augenstein et al. |
| 2010/0094851 A1 | 4/2010 | Bent et al. |
| 2010/0106934 A1 | 4/2010 | Calder et al. |
| 2010/0161492 A1 | 6/2010 | Harvey et al. |
| 2010/0198791 A1 | 8/2010 | Wu et al. |
| 2010/0205028 A1 | 8/2010 | Johnson et al. |
| 2010/0223078 A1 | 9/2010 | Willis et al. |
| 2010/0235606 A1 | 9/2010 | Oreland et al. |
| 2010/0250930 A1 | 9/2010 | Csaszar et al. |
| 2010/0333111 A1 | 12/2010 | Kothamasu et al. |
| 2010/0333116 A1 | 12/2010 | Prahlad et al. |
| 2011/0022642 A1 | 1/2011 | deMilo et al. |
| 2011/0125704 A1 | 5/2011 | Mordvinova et al. |
| 2011/0125766 A1 | 5/2011 | Carozza |
| 2011/0125894 A1 | 5/2011 | Anderson et al. |
| 2011/0138148 A1 | 6/2011 | Friedman et al. |
| 2011/0202792 A1 | 8/2011 | Atzmony |
| 2011/0225122 A1 | 9/2011 | Denuit et al. |
| 2011/0225123 A1 | 9/2011 | D'Souza et al. |
| 2011/0231447 A1 | 9/2011 | Starkey |
| 2011/0246717 A1 | 10/2011 | Kobayashi et al. |
| 2011/0307338 A1 | 12/2011 | Carlson |
| 2012/0054155 A1 | 3/2012 | Darcy |
| 2012/0076058 A1 | 3/2012 | Padmanabh et al. |
| 2012/0078848 A1 | 3/2012 | Jennas et al. |
| 2012/0079224 A1 | 3/2012 | Clayton et al. |
| 2012/0084414 A1 | 4/2012 | Brock et al. |
| 2012/0084789 A1 | 4/2012 | Iorio |
| 2012/0109892 A1 | 5/2012 | Novik et al. |
| 2012/0109935 A1 | 5/2012 | Meijer |
| 2012/0130988 A1 | 5/2012 | Nica et al. |
| 2012/0131278 A1 | 5/2012 | Chang et al. |
| 2012/0136835 A1 | 5/2012 | Kosuru et al. |
| 2012/0138671 A1 | 6/2012 | Gaede et al. |
| 2012/0158655 A1 | 6/2012 | Dove et al. |
| 2012/0159097 A1 | 6/2012 | Jennas, II et al. |
| 2012/0166390 A1 | 6/2012 | Merriman et al. |
| 2012/0166517 A1 | 6/2012 | Lee et al. |
| 2012/0179833 A1 | 7/2012 | Kenrick et al. |
| 2012/0198200 A1 | 8/2012 | Li et al. |
| 2012/0215763 A1 | 8/2012 | Hughes et al. |
| 2012/0221540 A1 | 8/2012 | Rose et al. |
| 2012/0254175 A1 | 10/2012 | Horowitz et al. |
| 2012/0274664 A1 | 11/2012 | Fagnou |
| 2012/0320914 A1 | 12/2012 | Thyni et al. |
| 2013/0019296 A1 | 1/2013 | Brandenburg |
| 2013/0151477 A1 | 6/2013 | Tsaur et al. |
| 2013/0290249 A1 | 10/2013 | Merriman et al. |
| 2013/0290471 A1 | 10/2013 | Venkatesh |
| 2013/0332484 A1 | 12/2013 | Gajic |
| 2013/0339379 A1 | 12/2013 | Ferrari et al. |
| 2013/0346366 A1 | 12/2013 | Ananthanarayanan et al. |
| 2014/0013334 A1 | 1/2014 | Bisdikian et al. |
| 2014/0032525 A1 | 1/2014 | Merriman et al. |
| 2014/0032579 A1 | 1/2014 | Merriman et al. |
| 2014/0032628 A1 | 1/2014 | Cudak et al. |
| 2014/0074790 A1 | 3/2014 | Berman et al. |
| 2014/0101100 A1 | 4/2014 | Hu et al. |
| 2014/0164831 A1 | 6/2014 | Merriman et al. |
| 2014/0180723 A1 | 6/2014 | Cote et al. |
| 2014/0258343 A1 | 9/2014 | Nikula |
| 2014/0279929 A1 | 9/2014 | Gupta et al. |
| 2014/0280380 A1 | 9/2014 | Jagtap et al. |
| 2015/0012797 A1 | 1/2015 | Leggette et al. |
| 2015/0016300 A1 | 1/2015 | Devireddy et al. |
| 2015/0074041 A1 | 3/2015 | Bhattacharjee et al. |
| 2015/0081766 A1 | 3/2015 | Curtis et al. |
| 2015/0242531 A1 | 8/2015 | Rodniansky |
| 2015/0278295 A1 | 10/2015 | Merriman et al. |
| 2015/0301901 A1 | 10/2015 | Rath et al. |
| 2015/0331755 A1 | 11/2015 | Morgan |
| 2015/0341212 A1 | 11/2015 | Hsiao et al. |
| 2015/0378786 A1 | 12/2015 | Suparna et al. |
| 2016/0005423 A1 | 1/2016 | Neppalli et al. |
| 2016/0048345 A1 | 2/2016 | Vijayrao et al. |
| 2016/0110284 A1 | 4/2016 | Athalye et al. |
| 2016/0110414 A1 | 4/2016 | Park et al. |
| 2016/0162354 A1 | 6/2016 | Singhai et al. |
| 2016/0162374 A1 | 6/2016 | Mutha et al. |
| 2016/0188377 A1 | 6/2016 | Thimmappa et al. |
| 2016/0203202 A1 | 7/2016 | Merriman et al. |
| 2016/0246861 A1 | 8/2016 | Merriman et al. |
| 2016/0306709 A1 | 10/2016 | Shaull |
| 2016/0323378 A1 | 11/2016 | Coskun et al. |
| 2016/0364440 A1 | 12/2016 | Lee et al. |
| 2017/0032007 A1 | 2/2017 | Merriman |
| 2017/0032010 A1 | 2/2017 | Merriman |
| 2017/0091327 A1 | 3/2017 | Bostic et al. |
| 2017/0109398 A1 | 4/2017 | Stearn |
| 2017/0109399 A1 | 4/2017 | Stearn et al. |
| 2017/0109421 A1 | 4/2017 | Stearn et al. |
| 2017/0169059 A1 | 6/2017 | Horowitz et al. |
| 2017/0262516 A1 | 9/2017 | Horowitz et al. |
| 2017/0262517 A1 | 9/2017 | Horowitz et al. |
| 2017/0262519 A1 | 9/2017 | Horowitz et al. |
| 2017/0262638 A1 | 9/2017 | Horowitz et al. |
| 2017/0264432 A1 | 9/2017 | Horowitz et al. |
| 2017/0270176 A1 | 9/2017 | Horowitz et al. |
| 2017/0286510 A1 | 10/2017 | Horowitz et al. |
| 2017/0286516 A1 | 10/2017 | Horowitz et al. |
| 2017/0286517 A1 | 10/2017 | Horowitz et al. |
| 2017/0286518 A1 | 10/2017 | Horowitz et al. |
| 2017/0322954 A1 | 11/2017 | Horowitz et al. |
| 2017/0322996 A1 | 11/2017 | Horowitz et al. |
| 2017/0344290 A1 | 11/2017 | Horowitz et al. |
| 2017/0344441 A1 | 11/2017 | Horowitz et al. |
| 2017/0344618 A1 | 11/2017 | Horowitz et al. |
| 2017/0371750 A1 | 12/2017 | Horowitz et al. |
| 2017/0371968 A1 | 12/2017 | Horowitz et al. |
| 2018/0004801 A1* | 1/2018 | Burchall ............... G06F 9/466 |
| 2018/0004804 A1 | 1/2018 | Merriman et al. |
| 2018/0095852 A1 | 4/2018 | Keremane et al. |
| 2018/0096045 A1 | 4/2018 | Merriman et al. |

(56) References Cited

U.S. PATENT DOCUMENTS

| | | |
|---|---|---|
| 2018/0165338 A1 | 6/2018 | Kumar et al. |
| 2018/0173745 A1* | 6/2018 | Balasubramanian ............... G06F 16/2336 |
| 2018/0300209 A1 | 10/2018 | Rahut |
| 2018/0300381 A1 | 10/2018 | Horowitz et al. |
| 2018/0300385 A1 | 10/2018 | Merriman et al. |
| 2018/0314750 A1 | 11/2018 | Merriman et al. |
| 2018/0343131 A1 | 11/2018 | George et al. |
| 2019/0102410 A1 | 4/2019 | Horowitz et al. |
| 2019/0303382 A1 | 10/2019 | Bostic et al. |
| 2020/0097486 A1 | 3/2020 | Horowitz et al. |

OTHER PUBLICATIONS

[No Author Listed], Automated Administration Tasks (SQL Server Agent). https://docs.microsoft.com/en-us/sql/ssms/agent/automated-adminsitration-tasks-sql-server-agent. 2 pages. [downloaded Mar. 4, 2017].

Chang et al., Bigtable: a distributed storage system for structured data. OSDI'06: Seventh Symposium on Operating System Design and Implementation. Nov. 2006.

Cooper et al., PNUTS: Yahoo!'s hosted data serving platform. VLDB Endowment. Aug. 2008.

Decandia et al., Dynamo: Amazon's highly available key-value store. SOSP 2007. Oct. 2004.

Nelson et al., Automate MongoDB with MMS. PowerPoint Presentation. Published Jul. 24, 2014. 27 slides. http://www.slideshare.net/mongodb/mms-automation-mongo-db-world.

Poder, Oracle living books. 2009. <http://tech.e2sn.com/oracle/sql/oracle-execution-plan-operation-reference >.

Stirman, Run MongoDB with Confidence using MMS. PowerPoint Presentation. Published Oct. 6, 2014. 34 slides. http://www.slideshare.net/mongodb/mongo-db-boston-run-mongodb-with-mms-20141001.

Van Renesse et al., Chain replication for supporting high throughput and availability. OSDI. 2004: 91-104.

Walsh et al., Xproc: An XML Pipeline Language. May 11, 2011. <https://www.w3.org/TR/xproc/>.

Wikipedia, Dataflow programming. Oct. 2011. <http://en.wikipedia.org/wiki/Dataflow_programming>.

Wikipedia, Pipeline (Unix). Sep. 2011. <http://en.wikipedia.org/wiki/Pipeline (Unix)>.

Wilkins et al., Migrate DB2 applications to a partitioned database. developerWorks, IBM. Apr. 24, 2008, 33 pages.

U.S. Appl. No. 16/846,916, filed Apr. 13, 2020, Horowitz et al.
U.S. Appl. No. 16/890,948, filed Jun. 2, 2020, Merriman et al.
U.S. Appl. No. 16/887,092, filed May 29, 2020, Horowitz et al.
U.S. Appl. No. 16/883,653, filed May 26, 2020, Horowitz et al.
U.S. Appl. No. 16/912,963, filed Jun. 26, 2020, Horowitz et al.

* cited by examiner

```
function isRetryableWritesSupported(server) {            ⎫  ─ 600
  if (server.getMaxWireVersion() < RETRYABLE_WIRE_VERSION) {
    return false;
  } if ( ! server.hasLogicalSessionTimeoutMinutes()) {     ⎬ ─ 602
    return false;
  } if (server.isStandalone()) {
    return false;
  } return true;
}                                                        ⎭
                                                            ─ 610
function executeRetryableWrite(command, session) {
  server = selectServer("writable");   ⎤ ─ 611 if ( ! isRetryableWritesSupported()) {  ⎤ ─ 612
    return executeCommand(server, command);
  }                                      ⎦
                                           ─ 613
  retryableCommand = addTransactionIdToCommand(command, session);

try {                                              ─ 614
    return executeCommand(server, retryableCommand);
  } catch (NetworkException originalError) {
    updateTopologyDescriptionForNetworkError(server, originalError);
  } catch (NotMasterException originalError) {
    updateTopologyDescriptionForNotMasterError(server, originalError);
  } try {
    server = selectServer("writable");   ⎬ ─ 615
  } catch (Exception ignoredError) {
    throw originalError;
  } if ( ! isRetryableWritesSupported()) {  ⎤ ─ 616
    throw originalError;
  }
                                                     ─ 617
  try {
    return executeCommand(server, retryableCommand);
  } catch (NetworkException secondError) {
    updateTopologyDescriptionForNetworkError(server, secondError);
    throw secondError;
  } catch (NotMasterException secondError) {
    updateTopologyDescriptionForNotMasterError(server, secondError);
    throw secondError;
  } catch (DriverException ignoredError) {
    throw originalError;
  }
}
```

*FIG. 6*

SYSTEMS AND METHODS FOR OPTIMIZATION OF DATABASE OPERATIONS

RELATED APPLICATIONS

This Application is a Non-Provisional of Provisional (35 USC 119(e)) of U.S. Application Ser. No. 62/522,540, filed Jun. 20, 2017, entitled "SYSTEM, METHODS, AND INTERFACES FOR A NOSQL DATABASE SYSTEM" and is a Non-Provisional of Provisional (35 USC 119(e)) of U.S. Application Ser. No. 62/522,150, filed Jun. 20, 2017, entitled "SYSTEMS AND METHODS FOR OPTIMIZING DISTRIBUTED DATABASE DEPLOYMENTS", which are herein incorporated by reference in their entirety.

BACKGROUND

Client systems use database systems for storing data for applications of the client system. A client system may submit operations to the database system. For example, a client system may submit a read operation to read data stored in the database. In another example, a client system may submit a write operation to insert data in the database.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

SUMMARY

According to various aspects, a distributed database can provide various levels of consistency and/or redundancy depending on architecture of the database. In various embodiments, conventional distributed databases can be enhanced to provide for failure resolution with respect to distributed write operations. According to some embodiments, a distributed database architected with an eventual consistency model can see significant improvements in reliability and/or consistency based on enhancing failure resolution of write operations.

In the MongoDB database, the distributed database provides for data replication and distribution of operations via a replica set architecture. The replica set architecture is based on a primary node hosting a primary copy of at least a portion of the database data. The primary node of the database data is responsible for processing write requests and replication of the executed write operations can then take place to secondary nodes. The secondary nodes are configured to provide for scalability and redundancy. For example, the secondary nodes can take over for a primary in the event of failure. In conventional operation, write operations are processed by primary nodes and replicated to the secondary nodes under an eventual consistency model.

In various embodiments, the system includes augmented database drivers that are configured to automatically retry execution of write operations if a failure is encountered. In some embodiments, a database daemon is configured to manage the database functionality for a respective database node (e.g., primary or secondary node). Retrying execution of write operations allows the drivers to automatically retry certain write operations a threshold number of times if, for example, a network error is encountered, or if a healthy primary node is not available.

According to one aspect, a database system is provided. The database system comprises a distributed database having a dynamic schema architecture, the distributed database comprising a replica set hosting a respective shard of data, wherein the replica set comprises: a primary node configured to perform write operations on the distributed database; and at least one secondary node configured to replicate write operations performed by the primary node; at least one processor configured to: receive, from a client system, a submission of a write operation to perform on the distributed database; execute the submitted write operation at least in part by transmitting a command to the primary node to perform the write operation; determine that the execution of the write operation failed responsive to determining occurrence of an error during execution of the write operation; and trigger re-execution of the submitted write operation responsive to determining that the execution of the write operation failed at least in part by re-transmitting the command to the primary node to perform the write operation.

According to one embodiment, the at least one processor is further configured to: receive, from the primary node, an identification of the error that occurred during execution of the write operation.

According to one embodiment, the at least one processor is further configured to determine that the execution of the write operation failed responsive to determining occurrence of a network error that interrupted communication with the primary node.

According to one embodiment, the at least one processor is further configured to determine that the execution of the write operation failed responsive to determining that the primary node was unavailable to perform write operations during execution of the write operation. According to one embodiment, the at least one processor is further configured to re-transmit the command to perform the write operation to a new primary node that becomes available to perform write operations on the database.

According to one embodiment, the at least one processor is further configured to wait a period of time after determining that the execution of the write operation failed before triggering re-execution of the write operation.

According to one embodiment, the at least one processor is further configured to encode the command transmitted to the primary node, the encoding comprising: including, in the encoded command, a unique transaction identifier associated with the write operation. According to one embodiment, wherein the at least one processor is further configured to: generate a session with the primary node via which the at least one processor transmits commands to perform one or more write operations to the primary node; and assign a unique transaction identifier to each of the one or more write operations. According to one embodiment, the transaction identifier comprises: a session identifier; and a monotonically increasing integer unique to each of the one or more write operations associated with the session.

According to one embodiment, the at least one processor is further configured to: determine whether a threshold number of execution attempts have been reached; and prevent re-execution of the write operation if the threshold number of execution attempts has been reached. According to one embodiment, the threshold number of execution attempts is one.

According to another aspect, a computer-implemented method of managing a database is provided. The method comprises acts of: storing data in a distributed database having a dynamic schema architecture, the storing comprising storing a replica set hosting a respective shard of data; performing, by a primary node of the replica set, write operations on the distributed database; replicating, by at least one secondary node of the replica set, write operations performed by the primary node; receiving, by at least one processor from a client system, a submission of a write operation to perform on the distributed database; executing, by the at least one processor, the submitted write operation at least in part by transmitting a command to the primary node to perform the write operation; determining, by the at least one processor, that the execution of the write operation failed responsive to determining occurrence of an error during execution of the write operation; and triggering, by the at least one processor, re-execution of the submitted write operation responsive to determining that the execution of the write operation failed at least in part by re-transmitting the command to the primary node to perform the write operation.

According to one embodiment, the method further comprises receiving, by the at least one processor from the primary node, an identification of the error that occurred during execution of the write operation.

According to one embodiment, the method further comprises determining, by the at least one processor, that the execution of the write operation failed responsive to determining that the primary node was unavailable to perform write operations during execution of the write operation. According to one embodiment, triggering re-execution of the submitted write operation includes re-transmitting the command to perform the write operation to a newly elected primary node.

According to one embodiment, the method further comprises waiting, by the at least one processor, a period of time after determining that the execution of the write operation failed before triggering re-execution of the write operation.

According to one embodiment, the method further comprises encoding, by the at least one processor, the command transmitted to the primary node, the encoding comprising including, in the encoded command, a unique transaction identifier associated with the write operation.

According to one embodiment, the method further comprises generating, by the at least one processor, a session with the primary node to transmit commands to perform one or more write operations to the primary node; and assigning, by the at least one processor, a unique transaction identifier to each of the one or more write operations.

According to another aspect, at least one non-transitory computer-readable storage medium storing processor-executable instructions is provided. The processor-executable instructions, when executed by at least one processor, cause the at least one processor to perform a method comprising: storing data in a distributed database having a dynamic schema architecture, the storing comprising storing a replica set hosting a respective shard of data; performing, by the primary node of the replica set, write operations on the distributed database; replicating, by the at least one secondary node of the replica set, write operations performed by the primary node; receiving a submission of a write operation to perform on the distributed database; executing the submitted write operation at least in part by transmitting a command to the primary node of the replica set to perform the write operation; determining that the execution of the write operation failed responsive to determining occurrence of an error during execution of the write operation; and triggering re-execution of the submitted write operation responsive to determining that the execution of the write operation failed at least in part by re-transmitting the command to the primary node to perform the write operation.

Still other aspects, examples, and advantages of these exemplary aspects and examples, are discussed in detail below. Moreover, it is to be understood that both the foregoing information and the following detailed description are merely illustrative examples of various aspects and examples, and are intended to provide an overview or framework for understanding the nature and character of the claimed aspects and examples. Any example disclosed herein may be combined with any other example in any manner consistent with at least one of the objects, aims, and needs disclosed herein, and references to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. The appearances of such terms herein are not necessarily all referring to the same example.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

FIG. 6 illustrates pseudocode of an example implementation for retrying execution of write operations, according to some embodiments.

DETAILED DESCRIPTION

Figure 1:
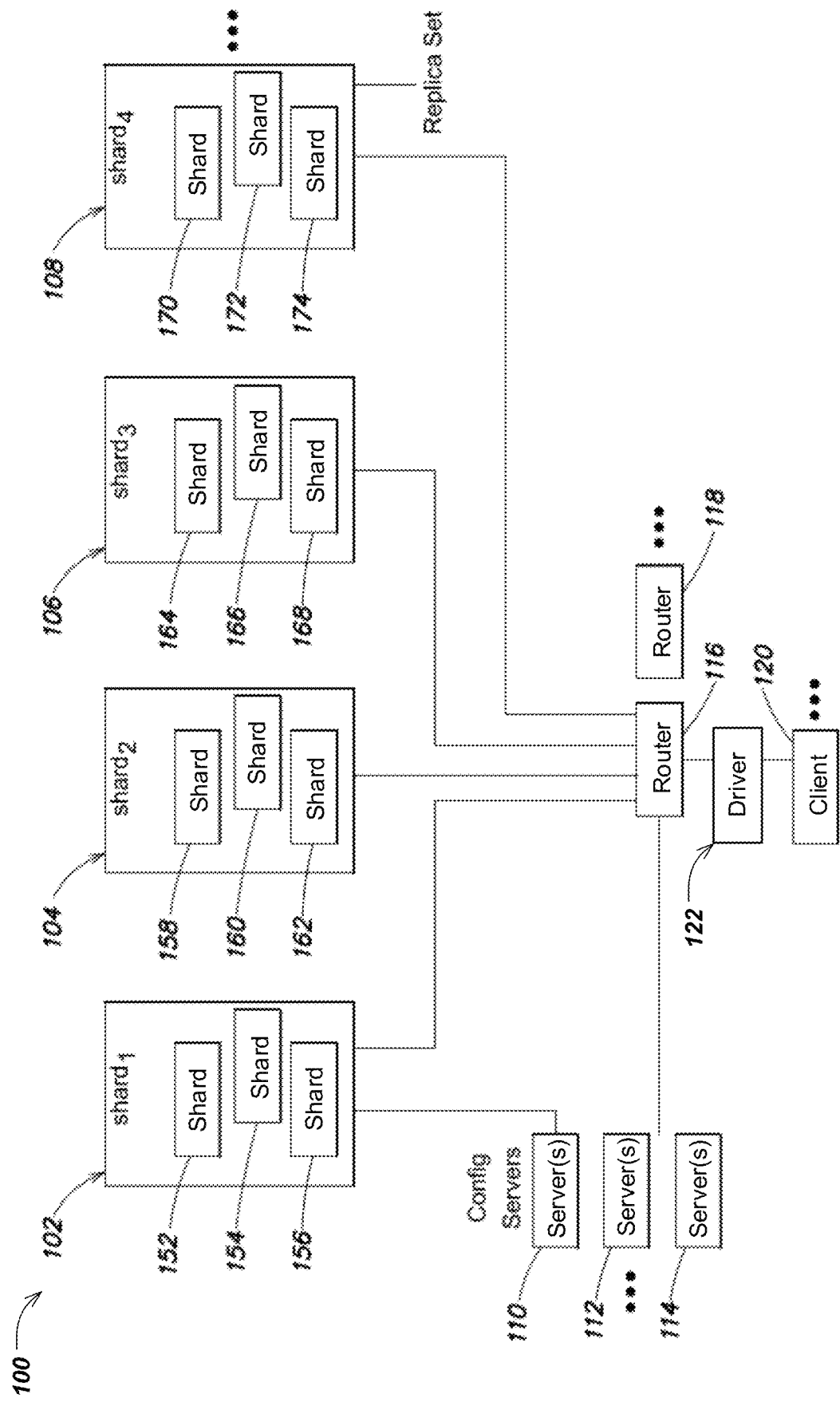
FIG. 1 shows a block diagram of an example architecture for a database management system, according to some embodiments.

According to one aspect, a database system is able to automatically retry execution of a failed write operation. A write operation may refer to any database operation that inserts, updates, removes, and/or replaces data stored in the database system. In some embodiments, the database provides for data replication and distribution of operations via a replica set architecture. The replica set architecture is based on a primary node hosting a primary copy of at least a portion of the database data. The primary node of the database data is responsible for performing write operations. Secondary nodes provide for scalability and redundancy by replicating the write operations performed by the primary node. The database system receives a submission of a write operation from a client system. For example, a client application may generate new data that is to be stored in the database. The database system executes the submitted write operation by transmitting a command to perform the write operation to a primary node of the database system, and then determines whether the execution failed. The database system determines whether execution failed by determining whether one or more errors occurred during the execution of the write operation. For example, the database system determines whether a network error occurred during execution of the write operation that may have prevented connection to the primary node. In another example, the database system determines that execution of the write operation failed because the primary node was unavailable when the database system was executing the write operation. If the database system determines that the execution of the write operation fails, the database system triggers re-execution of the submitted write operation by re-transmitting the command to perform the write operation to the primary node.

The inventors have recognized that conventional database systems require failed write operations to be handled by a respective client application using the database. A failure of a write operation may result in loss of data, or loss in consistency of the database. For example, a network error may have occurred during execution of the write operation. In this situation, the client application does not know whether the database was updated according to the submitted write operation. In another example, a primary node of the database system may be down when the write operation was submitted. In this situation, the database system may be unable to execute write operations submitted by the client application. In conventional systems, a client application may include logic (e.g., code) that handles situations in which a write operation that is submitted to a database system may have failed.

In some embodiments, a database system can be configured to determine failures of one or more write operations and trigger re-execution of the write operation(s). By doing so, the database system may remove the need for client systems using the database system to handle potential failures of the write operation(s). This eliminates the need for client applications to have code and logic designed to address failed executions of the write operation(s), and thus eliminates computations required by a client system to (1) determine whether a potential failure occurred in execution of the write operation(s), and (2) retry execution of the write operation(s). Furthermore, by automatically retrying execution of write operations, the database system is more robust in handling transient issues. For example, a temporary network problem may have prevented a write operation from being communicated to a primary node. The temporary network problem may be resolved after a short amount of time. By automatically retrying the write operation after a period of time, the system may be able to communicate the write operation to the primary node. This may eliminate delays caused when a transient issue prevents completion of a write operation, as the system no longer is required to generate and output a failure indication, or to stop execution of a series of write operations due to a single transient issue.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

FIG. 1 shows a block diagram of an example architecture for a managed database system 100, according to some embodiments of the present invention. The managed database system 100 has been specially configured as a shard cluster. The shard cluster is the grouping of shards that collectively represent the data within the database. A shard cluster typically comprises multiple shard servers (e.g., 102-108) hosting multiple partitions (e.g., 152-174) or shards of data. The managed database system 100 can include one or more configuration servers (e.g., 110-114) for metadata management, and shard router processes (e.g., 116-118). Metadata for the shard cluster can include, for example, information on the ranges of data stored in each partition, information associated with managing the shard cluster, partition counts, number of shard servers, data index information, partition size constraints, data distribution thresholds, among other options. In some embodiments, the database system 100 includes a driver 122 that receives submissions of operations from a client 120. The driver 122 can be configured to receive and handle submissions of database operations from a client application. For example, the driver 122 can be configured to receive one or more write operations from the client 120, and command one or more of the shard servers of the database system 100 to execute the write operation(s).

In some embodiments, each shard of data (e.g., 152-174) can be configured to reside on one or more servers executing database operations for storing, retrieving, managing, removing and/or updating data. In some embodiments, a shard server (e.g., 102-108) contains multiple partitions of data which can also be referred to as "chunks" of database data. In some embodiments, a shard of data corresponds to a chunk of data. A chunk is also a reference to a partition of database data. A chunk can be configured as a contiguous range of data from a particular collection in the database. In some embodiments, collections are logical organizations of subsets of database data. In some embodiments, a collection can comprise one or more documents. A document can comprise a unit of data storage. The document can include one or more fields and one or more values stored in the field(s). In one example, a collection of documents is a named grouping of the data, for example, a named grouping of documents. The named grouping can be homogenous or heterogeneous. In some embodiments, collections are organizations of database data similar to relational database tables.

In some embodiments, configurations within a shard cluster can be defined by metadata associated with the managed database referred to as shard metadata. Shard metadata can include information about collections within a given database, the number of collections, data associated with accessing the collections, database key properties for a given collection, ranges of key values associated with a given partition, shard, and/or chunk of data within a given collections, to provide some examples.

In some embodiments, establishing an appropriate shard key facilitates the efficient management of data within the shard cluster. To partition a collection, a shard key pattern can be specified. The shard key pattern, in some embodiments, can be similar to the key pattern used to define an index. The shard key pattern establishes one or more fields to define the shard key upon which the managed database can distribute data. In some embodiments, the shard key pattern can be input through a management process. The shard key pattern can be predefined and/or dynamically generated. Once established, the shard key pattern can be used to control the partitioning of data. The data can be partitioned in chunks of data. A shard of data can be a chunk. The chunks of data are typically constructed of contiguous ranges of data. According to one embodiment, the congruous range of data is defined based on database key values or database key patterns used associated with the data. In some examples, chunks are defined by a triple (collection, minKey, and maxKey). A given chunk can be configured with a named for the collection to which the chunk belongs corresponding to collection in the triples and a range of key values that defined the beginning and the end of the data found within the chunk corresponding to minKey and maxKey. In one example, the shard key K associated with a given document within a collection assigns that document to the chunk where the value for K falls within the values defined by minKey and maxKey. Thus, the shard database key/shard database key pattern defines the ranges of data found within a given chunk. The shard key ranges associated with a given partition can be used by the shard cluster (e.g. through a router process) to direct database requests to appropriate shard servers hosting the particular partition.

In some implementations, the maximum size can be predetermined. In some embodiments, the maximum size can be dynamically established. In some embodiments, a maximum size of 200 Mb establishes a good threshold that balances the costs of sharding (e.g., the computational burden associated with the copying/moving of the data and the versioning the chunks) against the improvement in processing by having sharded data. Some embodiments support compound shard keys/shard key patterns.

In some embodiments, the shard key should be selected to insure they are granular enough to provide for an even distribution of data. For instance, when a shard key is based on name, the database can be checked to insure there are not a disproportionate number of users with the same name. In such a case, an individual chunk can become too large and further, because of the key selected, be unable to split. In some implementations, logic can be implemented within the shard cluster to assist in selecting of the shard key. Distributions can be established and analyzed, for example during a testing phase, to insure that key does not invoke disproportionate distributions. For example, where the entire range comprises just a single key on name and a disproportionate number of users share the same name, it can become impossible to split chunks of the data without creating a new shard key. Thus, for a database where it is possible that a single value within a shard key range might grow exceptionally large, a compound shard key can be constructed that enables further discrimination of the values that a single key selection.

In some embodiments, a chunk of a data can also be associated with a maximum size threshold which defines that maximum size a given chunk can reach before a splitting operations is performed on the data within the chunk. In some embodiments, once the data within a given chunk reaches the maximum size, a managed database or a shard cluster can be configured to automatically generate a new chunk having its own range of contiguous data. In some examples, the data within the original chunk is split, approximately half the data remaining in the original chunk and approximately half the data being copied into the new created chunk. Although in some embodiments, the split can occur so that different portions of data remain in the original chunk and/or are copied into the new chunk.

In some embodiments, sharding of the database in data chunks, that is the partitioning of the data in the database, occurs based on database collections rather than the database as a whole. For example, when implementing a database management system for a service like the well-known TWITTER service, it is appreciated that the collection of "tweets" or messages within the database of the TWITTER service would be several orders or magnitude larger than the next largest collection. The size and throughput associated with the collection of tweets would be ideal for sharding, whereas smaller collections can be configured to reside on a single server. In some implementations, the data within the database is organized into documents. Some examples of document organization formats include the known JSON (JavaScript Object Notation) and BSON (binary encoded serialization of JSON) formatting for documents. BSON is a binary format in which zero or more key/value pairs are stored as a single entity. The BSON entity can be referred to as a document. In some examples, BSON is designed to be efficient in space, but in many cases is not much more efficient than JSON. In some cases BSON can employ more space than JSON to encode information. In one embodiment, this results from one of the BSON design goals: traversability. In some examples, BSON adds some additional information to documents, like length prefixes, that make it the document easier and faster to traverse. BSON is also designed to be fast to encode and decode. For example, integers are stored as 32 (or 64) bit integers, so they don't need to be parsed to and from text. This uses more space than JSON for small integers, but is much faster to parse.

Returning to FIG. 1, the three dots illustrated next to the system components indicate that the system component can be repeated. In some embodiments, adding additional shards, configuration servers, and/or shard routing processes can increase the capacity of the managed database system. The shard router processes 116-118 handle incoming requests from clients 120 (e.g., applications, web services, user initiated requests, application protocol interfaces, etc). The router processes 116-118 are configured to provide a transparent interface to handle database requests. In particular, the client 120 need not know that a database request is being served by a sharded database. The shard router processes receive client requests and route the database requests to one or more appropriate shards, e.g., 152-174 on shard servers 102-108.

In some embodiments, a router process, e.g., 116, can be configured to operate as a routing and coordination process that makes the various components of the cluster look like a single system, for example, to client 120. In response to receiving a client request (e.g., a write operation) via the driver 122, the router process 116 routes the request to the appropriate shard or shards. The shard(s) return any results to the router process. The router process 116 can merge any results and communicate the merged result back to the driver 122. The driver 122 can use the results for additional processing and/or communicate results to the client 120.

In some embodiments, the driver 122 can be configured to manage retrying of write operations submitted by the client 120. The client 120 may submit a write operation to the database 100 via the driver 122. The driver 122 can be configured to transmit a write command to execute the write operation to one or more shard servers (e.g., one or more of shard servers 102-108). In some embodiments, a route router process (e.g., router process 116) can be configured to route the write command to the appropriate shard server(s). In some embodiments, the driver 122 can be configured to determine, based on connectivity to the shard server(s) whether to retry execution of the write operation. For example, the driver 122 can be configured to determine whether a network error occurred that prevented the driver 122 from connecting to the shard server(s) to transmit a command to perform a write operation. In this situation, the driver 122 may determine to trigger re-execution of the write operation. In some embodiments, the shard server(s) can be configured to return an indication of the outcome of a performed execution to the driver 122. For example, the shard server(s) can be configured to return an indication of an outcome from executing a command received from the driver 122. In some embodiments, the driver 122 can be configured to determine, based on the returned outcome, whether to retry execution of the write operation. If the driver 122 determines from the indication of the outcome that execution of the write operation by the shard server(s) failed, the driver 122 can be configured to retry execution of the write operation. In some embodiments, the driver 122 can be configure to retransmit the write command to one or more shard servers to retry execution of the write operation.

In some embodiments, a shard may be hosted by a replica set. The replica set may include a primary node and one or more secondary nodes. In some embodiments, each of the nodes of the replica set may be a separate shard server to provide redundancy, and protection against failures. In some embodiments, the primary node may perform write operations. The secondary node(s) may replicate write operations performed by the primary node to provide redundancy. In some embodiments, if the primary node is unavailable, the database system may be unable to perform a write operation. For example, if the primary node of a replica set hosting a shard shuts down, the database may be unable to execute the write operation on the shard during the period that the primary node is shut down, or until a new primary node is selected.

In some embodiments, the driver 122 can be configured to transmit one or more write commands to a primary node of a replica set to perform one or more write operations submitted by the client 120. For example, the driver 122 can be configured to connect to the primary node to transmit the write command(s) to the primary node to perform write operation(s) submitted by the client 120. In some embodiments, if the driver 122 can be configured to determine that an error occurred which may have prevented performance of a write operation. In this case, the driver 122 can be configured to trigger re-execution of the write operation by re-transmitting the write command to the primary node. Example errors are discussed herein.

In some embodiments, the database system 100 can be configured to disable retrying of write operations submitted by the client 120 by default. In some embodiments, the database system 100 can be configured to enable retrying of write operations submitted by the client 120 by default. In some embodiments, the database system 100 can be configured to provide a user configurable option that enables or disables automatic retrying of write operations. One example of code for enabling retrying of write operations in the driver 122 is shown below.

mongodb://localhost/?retryWrites=true

In another example, the retrying of write operations can be enabled in a shell. One example of code for enabling retrying of write operations in a shell is shown below.

mongo -retryWrites

The above command may be executed in a shell for dynamically interacting with the database system 100.

In some embodiments, the router process 116 is configured to establish current state information for the data distributed throughout the database by requesting metadata information on the database from the configuration server(s) 110-114. The request for metadata information can be executed on startup of a routing process. Further requests can be initiated by the routing process and/or can be initiated by a configuration server. In one example, a change at the configuration server can trigger a distribution of updates to any routing processes.

In some embodiments, any changes that occur on the configuration server(s) can be propagated to each router process 116-118, as needed. In one example, router processes 116-118 can be configured to poll the configuration servers(s) 110-114 to update their state information periodically. In others examples, router processes can be configured to poll the configuration servers(s) 110-114 to update their state information on a schedule, periodically, intermittently, and can be further configured to received updates pushed from the configuration server(s) 110-114 and/or any combination of thereof. According to one embodiment, the router processes capture metadata information on the shard cluster stored at the configuration servers. In some examples, the metadata information includes information on the data stored in the database, how the data is partitioned, version information associated with the partitions, database key values associated with partitions, etc. According to some embodiments, the router process 116 can be configured without persistent state information. For example, at initiation the router process 116 cannot fully route data requests until its state is updated with the metadata describing the distribution of data throughout the shards.

In some embodiments, router processes can run on any server within the managed database and/or on any number of server(s) that is desired. For example, the router processes can be executed on stand-alone systems, and in other examples the router processes can be run on the shard servers themselves. In yet other examples, the router processes can be run on application servers associated with the managed database. Under typical installations, there are no limits on the number of router processes that can be invoked. The addition of routing processes can permit the managed database to route greater number of requests to the appropriate shards of data. In some embodiments, additional routing process can enable additional client connections to the partitioned database. In other embodiments, additional routing processes can facilitate management of the distribution of data within the database.

In some embodiments, each router process can be configured to act independently of any other routing processes being executed within the managed database. In some examples, the router processes do not coordinate processing, rather each router process can be configured to act independently. In some environments, this property enables unlimited numbers of router processes with virtually no additional complexity, as all the router processes receive their state information from the configuration servers and no coordination between the router processes is required for routing data requests.

In some embodiments, configuration server(s) 110-114 are configured to store and manage the database's metadata. In some embodiments, the metadata includes basic information on each shard in the shard cluster including, for example, network communication information, server information, number of chunks of data, chunk version, number of shards of data, shard version, and other management information for routing processes, database management processes, chunk splitting processes, etc. According to some embodiments, chunk information can be the primary data stored by the configuration server(s) 110-116. In some examples, chunks are defined by a triple (collection, minKey, and maxKey) and the metadata stored on the configuration servers establishes the relevant values for a given chunk of data.

In some embodiments, each of the installed configuration server(s) has a complete copy of all the chunk metadata information for the managed database. According to one aspect, various replication strategies can be implemented to maintain consistency between configuration servers. In some embodiments, updates to configuration data stored on the configuration server can require additional processes for insuring consistency. For example, a two-phase commit operation, is used to ensure the consistency of the configuration data amongst the configuration servers. In another example, various atomic commitment protocols (ACP) are used to insure consistency of the database metadata on any configuration servers.

Figure 2:
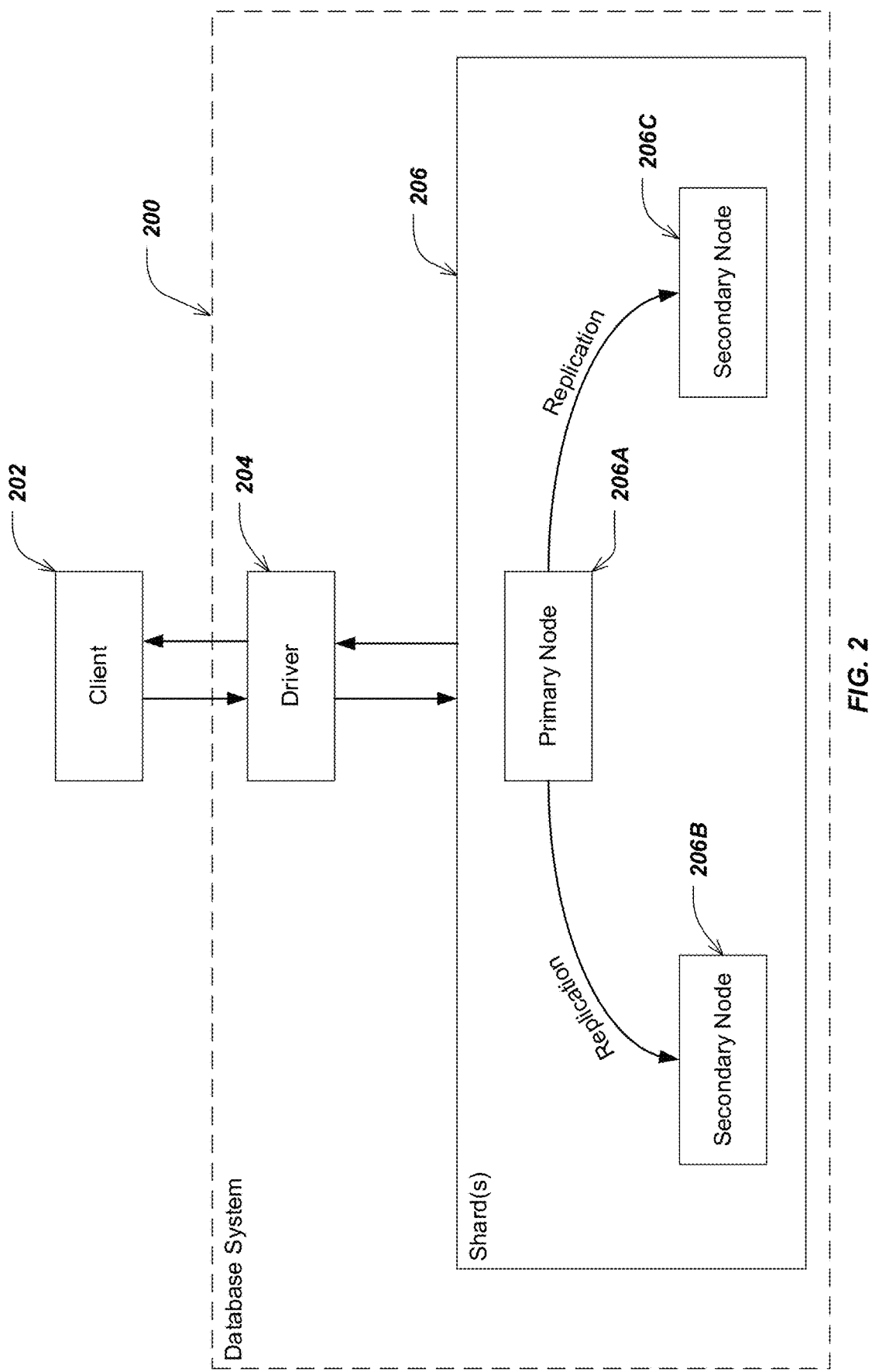
FIG. 2 shows a block diagram of components of a database system and example interactions among components of a database system, according to some embodiments.

FIG. 2 shows a block diagram of components of a database system 200 and example interactions among components of the database system 200, according to some embodiments. The database system 200 may, for example, be database system 100 discussed above with references to FIG. 1. The database system 200 may include a driver 204 via which a client system 202 (e.g., a client application) may interact with the database 200. The driver 204 may submit commands to one or more shard servers 206 to execute one or more operations submitted to the driver 204 by the client 202.

In some embodiments, the driver 204 can be configured to handle interactions with the client 202. For example, the driver 204 can be configured to include a client library which allows the client 202 to submit operations to the database system 200. In some embodiments, the driver 204 can be configured to interact with the client 202 in a software language (e.g., C, C++, C#, Java, Perl, PHP, Python, Ruby, and/or Scala) appropriate for the client 202. For example, the driver 204 can be configured to interact with the client 202 used by an application of the client system. The driver 204 can be configured to provide functions in the language used by the client 202 by which to interact with the database system 200. In some embodiments, the driver 204 can be configured to provide functions by which the client 202 can submit database operations. For example, the driver 204 may receive one or more write operations to be executed by the database system. The write operation(s) may specify insertion of new data, updating of existing data, removing of data, and or replacing data. In another example, the driver 204 may receive one or more read operations which specify data that the client 202 requests to read from the database.

In some embodiments, the driver 204 can be configured to generate and transmit commands to the shard server(s) 206 in order to execute requests received from the client 202. In some embodiments, the driver 204 can be configured to generate commands to execute database operations requested by the client 202. For example, the driver 204 may receive one or more write operations from the client 202, generate one or more write commands, and transmit the write command(s) to the shard server(s) 206 to execute the write operation(s).

In some embodiments, the shard server(s) 206 includes a primary node 206A that performs write commands. For example, the shard server(s) 206 may include multiple shard servers of which one is the primary node 206A. In some embodiments, the driver 204 can be configured to transmit commands to perform write operations to the primary node 206A. The write operations performed by the primary node 206A may then be replicated by secondary nodes 206B-C such that the entire replica set is synchronized. In some embodiments, the primary node 206A can be configured to store an operation log of operations that the primary node performs. The secondary nodes 206B-C can be configured to replicate the write operations by reading the operation log and performing the operations such that the secondary nodes match the primary node.

In some embodiments, a write operation is successfully executed when the primary node 206A has performed the write operation. In some embodiments, a write operation is successfully executed when a write completion requirement is met. In some embodiments, the write completion requirement may specify a threshold number of nodes have performed the write operation for the write operation to be determined as complete. In some embodiments, the threshold number of nodes may be a majority of nodes. In some embodiments, the threshold number of nodes may be a number of nodes specified by a user (e.g., by the client 120).

In some embodiments, the driver 204 can be configured to determine whether an error occurred while executing a write operation that may have prevented the write operation from being completed successfully. In some embodiments, if the primary node 206A is unavailable, the database system 200 may be unable to perform a write operation. For example, if the primary node 206A shuts down, the driver 204 may be unable to transmit a command to perform a write operation to the primary node 206A during the period that the primary node 206A is shut down, or until a new primary node is selected. If the driver 204 determines occurrence of an error that interfered with communication with the primary node 206A, the driver 204 may determine to retry execution of the write operation. In some embodiments, the driver 204 can be configured to trigger re-execution of the write operation by re-transmitting a write command to the primary node 206A.

In some embodiments, the driver 204 can be configured to determine whether an error occurred in performing the write operation by the shard server(s) 206. In some embodiments, the driver 204 can be configured to receive a response from the primary node 206A indicating an outcome of performing a received write command. In some embodiments, the driver 204 may receive a message indicating an outcome of performing the message. The message may indicate that the write operation was performed successfully. For example, the message may include a Boolean field that is set to a first value if the write operation was successful, and a second value if the write operation failed. In some embodiments, the message includes an indication of any errors that occurred during performance of a write operation. The message may include error codes associated with failures or problems that occurred during performance of the write operation. In some embodiments, the message may include additional information about the detected error. For example, the message may include a string describing the error.

In some embodiments, the database system 200 (e.g., the driver 204 and/or one of the nodes 206A-C) can be configured to determine whether certain errors occurred during execution of a write operation. The database system 200 may generate an error code that corresponds to a particular type of error. In some embodiments, the driver 204 can be configured to determine that execution of a write operation failed based on occurrence of the error. Example errors include:

1. A network exception (e.g., a connection timeout or error)—There was a problem in establishing a connection with the primary node 206A.
2. Execution interrupted due to a server shutdown—The primary node 206A that is to execute the operation(s) has shut down.
3. Primary node is unavailable—The primary node 206A is not available to execute the operation(s).
4. Primary node has stepped down—There is not currently a primary node to execute the operation(s).
5. Server shutdown is in progress—The primary node 206A is in the middle of shutting down and thus is unable to execute the operation(s).
6. Write concern requirement not met—This indicates that a minimum number of nodes of the shard(s) 206 failed to perform the write operation(s).
7. Host not found—The primary node 206A could not be located.
8. Host unreachable—The node(s) hosting the data associated with the operation could not be reached.
9. Network timeout—The connection with the primary node 206A timed out. This can occur because of slow operation of the primary node 206A.
10. Node is recovering—The primary node 206A that is to execute the operation(s) is currently recovering from a down state.

Some embodiments are not limited to generating indications of the failures described herein. Some embodiments can be configured to generate indications of other types of outcomes.

In some embodiments, the driver 204 can be configured to use indication(s) of the outcome(s) to determine whether execution of one or more operations has failed. The driver 204 can be configured to determine occurrence of one or more errors based on error codes generated by the database system 200 during execution of the write operation. In some embodiments, the driver 204 can be configured to determine to trigger re-execution of the write operation(s) based on the indication(s). The driver 204 can re-transmit write command(s) to retry execution of the operation(s). For example, the driver 204 can be configured to determine, based on the indication(s), that a particular type of error occurred. The driver 204 can be configured to re-transmit the command(s) to the primary node 206A to retry execution of the operation(s).

In some embodiments, the driver 204 can be configured to communicate indications of outcomes of the submitted operation(s) to the client 202. For example, the driver 204 may transmit an indication that the submitted operation(s) were successful. In another example, the driver 204 may transmit data retrieved for a read operation. In yet another example, the driver 204 may transmit an indication of an error that occurred and prevented successful execution of the operation(s).

Although the driver 204 is illustrated in FIG. 2 as separate from the shard server(s) 206 and the client 202, some embodiments are not limited to this configuration. In some embodiments, the driver 204 may be implemented on one or more of the shard server(s) 206. In some embodiments, the driver 204 may be implemented on the client system 202. In some embodiments, the driver 204 may be implemented on one or more separate servers. In some embodiments, the driver 204 may be distributed across the shard server(s) 206 and the client system 202.

Co-pending U.S. application Ser. No. 15/074,987 entitled "METHOD AND APPARATUS FOR MAINTAINING REPLICA SETS" filed on Mar. 18, 2016 incorporated herein by reference describes example election protocols and replica set architectures that can be augmented with some embodiments.

Figure 3:
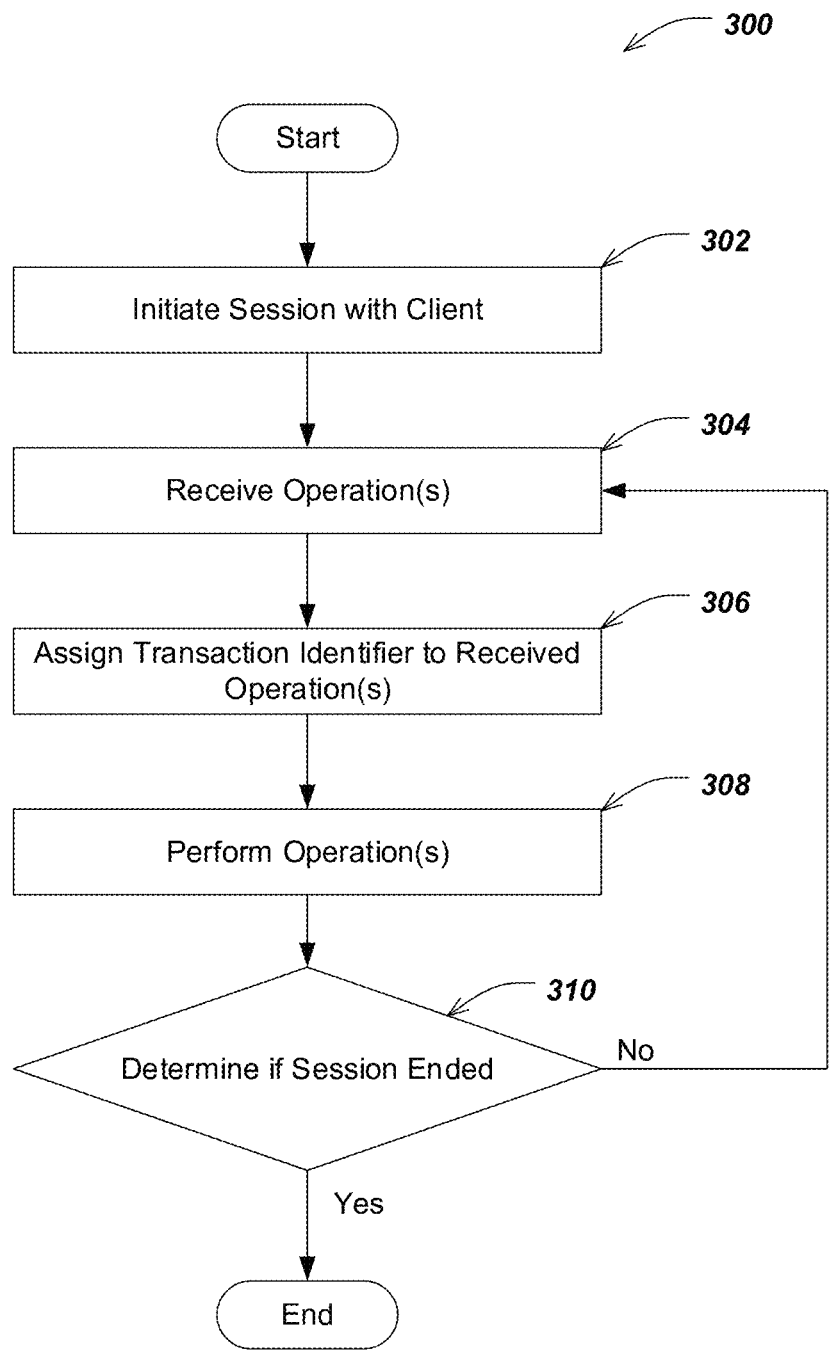
FIG. 3 illustrates a flow chart of a process by which a database system interacts with a client, according to some embodiments.

FIG. 3 illustrates a flow chart of a process 300 by which a database system interacts with a client system, according to some embodiments. The process 300 may be performed by driver 122 of database system 100 described above with reference to FIG. 1.

Process 300 begins at block 302 where the system initiates a session with a client system (e.g., client 202). In some embodiments, the system can be configured to receive a request from the client to establish a session in which the client can request execution of one or more operations. In some embodiments, the session can be configured to represent a set of operations that are submitted by the client. In some embodiments, the system can be configured to generate a data object that stores information related to the session established with the client. In some embodiments, the system can be configured to generate a session identifier for the session. The database can be configured to associate client submitted operations to the session using the session identifier. For example, the system can be configured to include the session identifier with commands that the system transmits to a primary node for execution of the operations. In some embodiments, the system can be configured to initiate a session based on a response to initiation of a session on the client system. For example, the client may start a session in order to perform database operations (e.g., reads and/or writes). In response, the system can be configured to initiate a session via which one or more shard servers can receive commands to execute operations requested by the client. In some embodiments, the system can be configured to associate multiple client sessions with a single session through which the server(s) may receive operations. For example, the database system may associate a single session with multiple different client sessions started by different users of a client application.

Next, process 300 proceeds to block 304 where the system receives submissions of one or more operations from the client. In some embodiments, the system can be configured to provide the client a library with which the client can request execution of operations. Through the established session, the system receives submissions of operations from the client. The pseudocode below illustrates initiation of a session and submission of an operation using the session.

> var session -startSession({retry_writes: True});
> session.db.collection.updateOne({'id': 1}, {'$inc': {'counter': 5}});

In the above example code, the client has initiated a new session by generating a session variable using the "startSession" function. In the next line, the system receives an operation submission for updating the document having the '_id' field equal to 1 by incrementing the 'counter' field of the document by 5. In this example, when the session is initiated by the client, the system can be configured to generate a session data object specifying a session identifier that operations received from the client will be associated with.

Next, process 300 proceeds to block 306 where the system assigns a unique transaction identifier to received operation(s). In some embodiments, the system can be configured to generate a unique transaction identifier that includes a session identifier, and a unique value that identifies the operation within the session. In some embodiments, the unique value can comprise a monotonically increasing number that is incremented with for each operation received in the session. In some embodiments, the number may be an integer (e.g., a 32, 64, or 128-bit represented integer) that is assigned to the operation.

In some embodiments, the system only assigns a transaction identifier to certain types of received operations. In some embodiments, the system can be configured to assign a transaction identifier to write operations for which the system may retry execution in the case of failure. In some embodiments, the system may not assign a transaction identifier to certain types of received operations. For example, read operations may not have a need for a unique transaction identifier. In this example, the database system may not assign a transaction identifier to the read operations.

Next, process 300 proceeds to block 308 where the system performs the received operation(s). For example, the system may transmit one or more commands to one or more primary nodes of one or more replica sets hosting shards of the database. In response to the received command(s), the primary node(s) may perform updates to stored data, add new data, replace data, delete data, or read data according to the received operation(s). The system may further generate indications of outcomes of performing the operation(s). In the case of a read operation, the system may retrieve data specified in a read operation, and return the data to the client. In the case of a write operation, the system may generate an indication of an outcome of execution of the operation(s). For example, the system can generate a message indicating success or failure of the operation(s) and/or information specifying particular one or more errors that may have occurred during performance of the operations(s). Example processes by which the database system performs write operations are discussed below with reference to FIGS. 4 and 5.

In some embodiments, the system can be configured to use the transaction identifier to limit the number of times that an operation is performed. If the system commands one or more servers to execute an operation, and the server(s) have already performed the operation, the server(s) can return an indication of the outcome of the operation from a previous execution. For example, if the transmits a command to primary node to perform an operation, the primary node may have previously performed the operation. In this case, the primary node may return a stored indication of the outcome of previous performance of the operation. To do so, the primary node may recognize that the transaction identifier of the command matches one that was previously received. If the operation was executed successfully, the primary node may ignore the submission and reply with a stored indication of the outcome of the operation. This may prevent operations from inadvertently being executed multiple times. For example, an unreliable network connection may cause transmission of a command to a primary node multiple times by a driver. In this case, the primary node may determine to not perform the command multiple times after a successful completion.

Next, process 300 proceeds to block 310 where the system determines whether the session has ended. If the system determines that the session has ended 310, YES, process 300 ends. For example, the client may have completed a set of operations. In this case, the system can end the session. If the system determines that the session has not ended 310, NO, the process 300 returns to block 304 where the system may continue receiving operations from the client in the session.

Figure 4:
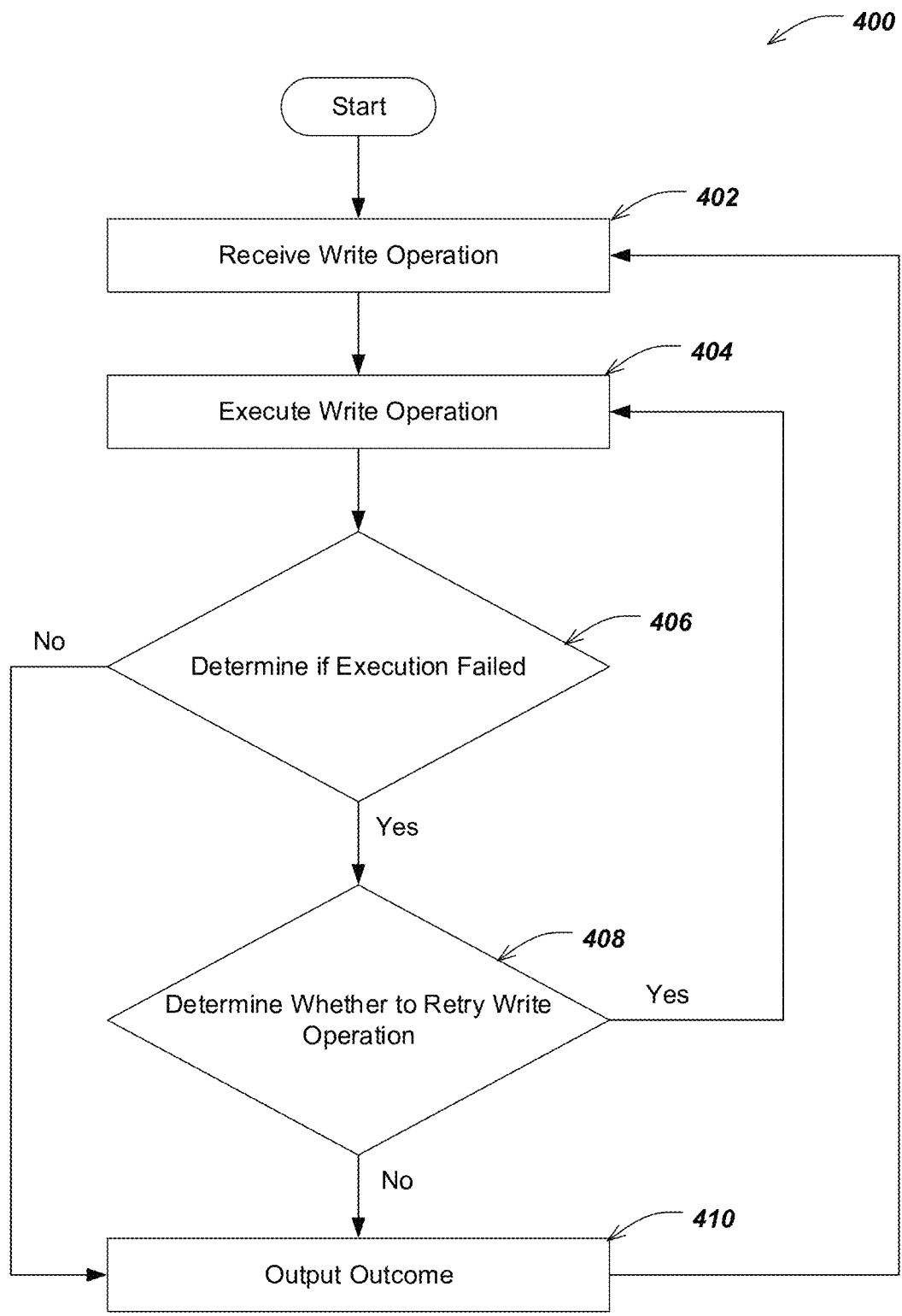
FIG. 4 illustrates a flow chart of a process by which a database system may retry execution of a write operation, according to some embodiments.

FIG. 4 illustrates a flow chart of a process 400 by which a database system may retry execution of a write operation, according to some embodiments. Process 400 may be performed by driver 122 of database 100 described above with reference to FIG. 1. Process 400 may be performed as part of performing an operation in block 308 of process 300 described above with reference to FIG. 3.

Process 400 begins at block 402 where the system receives a write operation. The system may receive a write operation (e.g., update, insert, replace, and/or delete) to make a modification in the database. For example, the client may submit an operation to modify one or more documents stored in the database.

Next, process 400 proceeds to block 404, where the database system executes the write operation. In some embodiments, the system can be configured to transmit a write command to one or more shard servers to execute the write operation. The database system can be configured to transmit a write command to a primary node of a replica set to perform the write operation in the database. For example, the primary node of the replica set may perform the write operation in a shard hosted by the replica set. The write operation may then be replicated by one or more secondary nodes of a replica set. In some embodiments, the system can be configured to generate a unique transaction identifier associated with the command. In some embodiments, the database system can be configured to select a shard server that is to execute the write operation. For example, nodes of a replica set may be separate shard servers. To execute the write operation, the system can be configured to select the primary node shard server to execute the write operation.

In some embodiments, the system can be configured to select a shard server to perform an operation from among multiple shard servers of a sharded cluster. The system locates one or more shards that are associated with the write operation. For example, the system locates a shard where a document to be added to the database is to be added by performing the write operation. In another example, the system locates a shard where an existing document is to be updated by performing the write operation. The system then transmits a write command to a shard server storing the located shard. In some embodiments, the shard may be hosted by a replica set which includes multiple nodes which each host a copy of the shard. The system can be configured to transmit the command to the primary node of the replica set in order to perform the write operation.

An example process 500 of executing a write operation is discussed below with reference to FIG. 5.

Next, process 400 proceeds to block 406, where the system determines whether execution of the write operation has failed. In some embodiments, a shard server that is performing the operation in response to a write command from the system can be configured to generate an indication of an outcome from performance of the operation. The indication of the outcome may indicate whether the execution of the operation failed. In some embodiments, the shard server can be configured to generate a an indication of an error that occurred when execution the operation. For example, the shard server can be configured to generate an error code indicating a specific problem that occurred when performing the operation. Example problems that may cause failure of execution of a write operation are discussed herein.

In some embodiments, a primary node can be configured to receive a write command from a system to perform the write operation. The primary node may generate a response to performing the write command. In some embodiments, the primary node can be configured to generate a value indicating whether the operation was completed successfully. For example, the primary node can be configured to generate an output message that the primary node transmits to the system which includes a Boolean value indicating whether the operation was successfully performed. In some embodiments, the primary node can be configured to generate an indication of an error (e.g., an error code and/or error description) that occurred during performance of an operation. The primary node can be configured to generate an output message that includes error codes associated with one or more errors that occurred during performance of the write operation. The primary node may transmit the message to a system of the database system.

In some embodiments, the shard server can be configured to store an indication of the outcome for a transaction identifier of the write operation. In some embodiments, the shard server can be configured to store the indication of the outcome in a session data object. The shard server may store a record of received write commands and respective outcomes received during a session. For example, the shard server may store a document that includes a record of write commands received from a system during a session. In some embodiments, the shard server may store an outcome of performing the write command in the record of the write command.

In some embodiments, the system can be configured to use an outcome of a write operation received in response to transmission of a write command to determine whether the write operation failed. In some embodiments, the system may determine whether the write operation failed based on a response received from a shard server (e.g., a primary node) indicating the outcome of the shard server performing the write operation in response to a write command transmitted by the system. For example, if the indication of the outcome is an error code indicating a problem that may have prevented the primary node from successfully performing the operation, the system may determine that the write operation failed. In another example, shard server may generate an acknowledgement message that indicates that the write operation was successful. In this instance, the system may determine that the write operation did not fail.

In some embodiments, the system can be configured to determine that execution of the write operation failed based on an error that interfered with communication with a shard server. For example, a network error may have prevented the system from connecting to a primary node to perform a write operation. In another example, a network error may have interrupted a connection between the system and the primary node. The system may determine that execution of the write operation failed if a network error occurs.

If, at block 406, the system determines that the execution of the write operation did not fail 406, NO, process 400 proceeds to block 410 where the database system outputs an indication of an outcome. For example, the database system may output a message to the client that the write operation was successful. After outputting the indication of the outcome, process 400 proceeds to act 402 where the database system may receive another write operation to execute.

If, at block 406, the system determines that the execution of the write operation failed 406, YES, process 400 proceeds to block 408 where the system determines whether to retry execution of the write operation. In some embodiments, the system can be configured to limit retrying of a write operation to a threshold number of times. The threshold may be 2, 3, 4, 5, 6, 7, 8, 9, or 10 retries. In some embodiments, the system can be configured to retry execution of the write operation one time, because if the execution fails on a single retry, the system may determine that the problem is persistent. As a result, retrying execution of the operation may be a waste of computational resources and time for the client system. If the system has determined that a threshold number of retries have been performed, the system may determine to not retry execution of the write operation.

In some embodiments, the system can be configured to wait for a period of time before retrying execution of the write operation. The system can be configured to wait for the period of time in order to allow the shard server(s) to recover from a problem that prevented execution of the write operation in the previous attempt. In some embodiments, the system can be configured to wait for the period of time before re-transmitting a write command to a primary node. For example, if a primary node was not available to execute the write operation in the first attempt, a new primary node may now be available to execute the write operation. In another example, if the primary node shut down and thus could not execute the write operation, the period of time may allow the shard server to restart. In some embodiments, the system can be configured to monitor the status of a shard server (e.g., a primary node) that was unavailable to perform the write operation. The system can be configured to wait for the period of time to allow recovery from the problem that caused the error. For example, the period of time may allow a new primary node to be elected or allow a shard server to start up after being in shut down. When the system has determined that the primary node has recovered from the problem, the system may determine to retry execution of the write operation. For example, the system can re-transmit a write command to the primary node to perform the write operation.

In some embodiments, the system can be configured to have a maximum period of time which the system will wait to retry execution of the write operation. If a failure or problem persists beyond the maximum period of time, the system can be configured to determine to not retry execution of the write operation. If the system does recover from the failure within the maximum period of time, the system may determine to retry execution of the write operation. This may allow retrying of write operations that failed because of temporary problems, while not causing a system delay by attempting to retry execution for persistent problems. For example, if a first execution of the write operation failed due to a server shutdown, the database system may wait for the maximum period of time. If the server does not recover within the maximum period of time, the database system may determine to not retry execution of the write operation. If the server does recover within the maximum period of time, the database system may determine to retry execution of the write operation.

In some embodiments, the system can be configured to determine whether to retry execution of the write operation based on whether the system is able to select a server to execute the write operation. For example, the system may select a server that is a primary node of a replica set to perform the write operation. If the system is unable to select a server to perform the write operation, the system may determine to not retry execution of the write operation. In some embodiments, the system can be configured to determine whether to retry execution of the write operation based on whether a selected server to execute the write operation is capable of retrying write operations. For example, some servers may not be updated and thus not have the capability to retry executions of a write operation. If the system determines that a selected server is unable to retry execution of the write operation, the system may determine to not retry execution of the write operation. In some embodiments, the system can be configured to search for another server that can retry execution of the operation.

If, at block 408, the system determines to retry execution of the write operation 408, YES, process 400 proceeds to block 404 where the system retries execution of the write operation. In some embodiments, the system can be configured to re-transmit a write command to a primary node to perform the write operation. For example, the system can be configured to determine, based on an indication of an error in a response from the primary node, or from occurrence of a network error, that the write operation failed. The system may then re-transmit a write command to the primary node to perform the write operation. In some embodiments, when the system retries execution of the write operation, the system can be configured to reselect a server that is to perform the write operation. For example, if a primary node of a replica set changes, the system may select a different server than the one in a previous execution attempt to execute the write operation.

If, at block 408, the system determines to not retry execution of the write operation 408, NO, then process 400 proceeds to act 410 where the database system outputs an indication of the outcome. In this case, the system may output an indication that the write operation has failed to the client. For example, the system can be configured to output an error code that indicates a problem that prevented the write operation from completing. The client may use the indication of the outcome to take appropriate action. After outputting the indication of the outcome at block 410, the process 400 proceeds to block 402 where the system may receive another write operation to execute.

Figure 5:
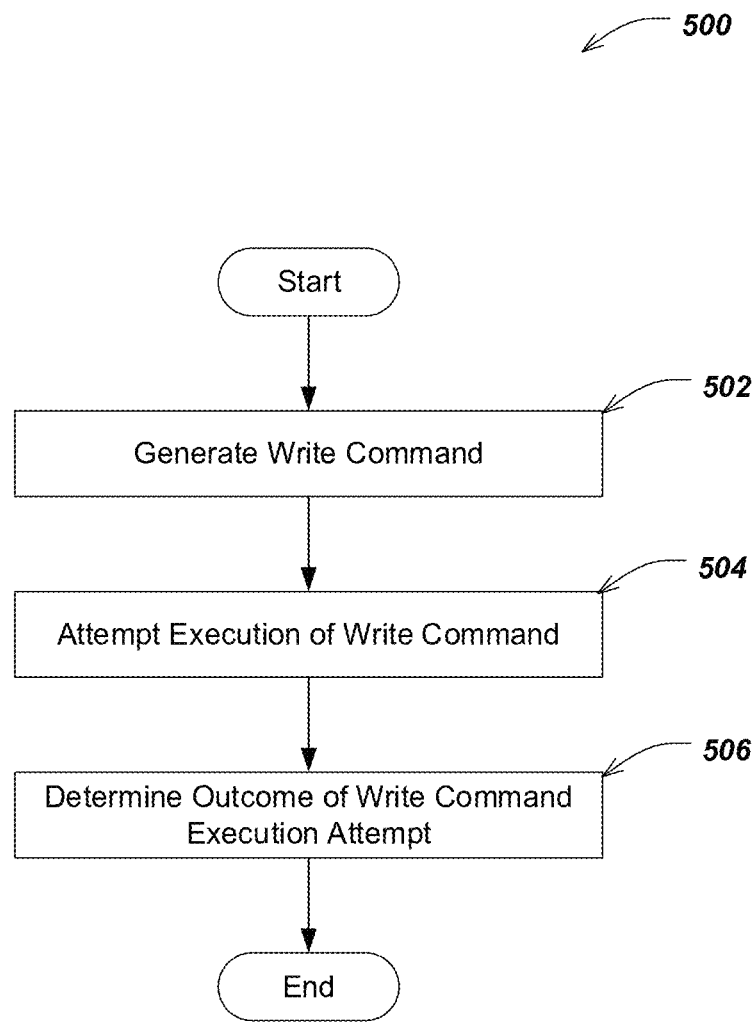
FIG. 5 illustrates a flow chart of a process by which a database system may execute a write operation, according to some embodiments.

FIG. 5 illustrates a flow chart of a process 500 by which a database system may execute a write operation, according to some embodiments. The process 500 may be performed by driver 122 of database system 100 described above with reference to FIG. 1. The process 500 may be performed as part of process 400 described above with reference to FIG. 4.

Process 500 begins at block 500 where the system generates a write command. In some embodiments, the system may receive a submission of a request to complete a write operation from a client system. The system can be configured to generate a write command for executing the write operation. In some embodiments, the write operation may be represented in the database system by the generated write command. In some embodiments, the system can be configured to encode the write command that is then submitted to one or more shard servers for execution. In some embodiments, the system can be configured to (1) generate a transaction identifier that is included in the write command, (2) include a specification of which data items in the database to update, (3) include a specification of the updates to make to those data items, and/or (4) include a configuration setting of options associated with the operation. The code below illustrates an example of a write command generated by the system.

```
{
    update: "coll",
    lsid: { ... },
    txnNumber: 100,
    updates: [
        { q: { x: 1 }, u: { $inc: { y: 1 } }, multi: false, upsert: false },
    ],
    ordered: true
}
```

The above encoded write command specifies an update to a collection. The write command includes a transaction identifier which includes a session identifier (lsid) and a number (txnNumber) associated with the write operation. The write command further includes the updates to make to the collection (updates), and a setting of the "ordered" configuration for the operation. In some embodiments, the system can be configured to generate the write command as a data item. In some embodiments, the system can be configured to generate the write command as a JSON object, a BSON object, a text file, or in another format.

After generating the write command, process 500 proceeds to block 504 where the system attempts execution of the write command. In some embodiments, the system transmits the write command to a shard server that attempts to execute the write command. For example, the primary node may execute the write command according to the encoded instructions. In some embodiments, the system may transmit the write command to a primary node of a replica set. If successfully performed by the primary node, secondary nodes of the replica set may replicate the write operation as described herein.

In some embodiments, the system can be configured to select a shard server that is to perform the write command. For example, the write command may specify a write operation that updates data in a replica set hosted by a replica set that includes a primary node and one or more secondary nodes. Each of the nodes may be a separate shard server. In some embodiments, the primary node may be configured to handle write operations. The system can be configured to select the primary node to perform the write operation when executing of the write command.

Next process 500 proceeds to block 506 where the system determines an outcome of the attempted execution of the write command. In some embodiments, a shard server that attempts to perform the write operation may determine whether the write operation succeeded or failed. In some embodiments, the system can be configured to determine whether an error has occurred that affected execution of the write operation. Examples of errors are discussed herein. In some embodiments, the shard server can be configures to generate an indication of the outcome. For example, the system can be configured to generate an acknowledgement indicating that the execution was successful or an error code indicating a problem that occurred during an attempted execution. In some embodiments, the system can be configured to use the generated indication to determine whether to retry execution of the write operation (e.g., as described in process 400 discussed above with reference to FIG. 4).

FIG. 6 illustrates pseudocode 600 of an example implementation to retry execution of a submitted write operation, according to some embodiments. The pseudocode 600 includes a definition of a function 602 for determining whether a server (e.g., a primary node) that is to execute the write operation is capable of retrying execution of write operations. In some embodiments, the database system may include one or more servers that are unable to retry write operations as the feature has not yet been implemented on the server. The pseudocode 600 also includes a definition of a function 610 that (1) executes a write operation, and (2) retries execution of the write operation upon failure of a first execution. The function 610 begins execution of a write operation at 611 by selecting a server to execute the write operation. For example, the database system may search for a primary node to execute the write operation. Next, at 612, the database system determines whether the selected server from 611 supports retrying of write operations. This is done by calling the function 602 for determining whether the server supports retrying of write operations. If the selected server does not support retrying of write operations, the database system executes the write operation without retrying the write command in the case of a failed execution.

At 613, the system generates and assigns a transaction identifier to the write operation. For example, the system may generate the transaction identifier and store it in a write command as described above at block 502 in process 500 described above with reference to FIG. 5. The system may associate the command with a session. At 614, the system executes the write operation a first time. The system also determines whether certain errors occurred in executing the write operation. In this example, the database system checks whether a network error occurred or whether the primary node or a replica set that is configured to perform write operation was unavailable to execute the write operation. If the primary node is unavailable, then the system may determine that execution of the write operation failed. If the system determines that either of the errors were detected during the first execution, the system may proceed to trigger re-execution of the write operation.

At 615, the system selects a server to retry execution of the write operation. For example, the system selects a primary node of a replica set hosting a shard to perform the write operation. If the system is unable to select a server to retry execution of the write operation, then the system outputs the original error. At 616, the system determines if a selected server supports retrying execution of the write operation. If the selected server does not support retrying execution of the write operation, then the system may output the original error. At 617, the system retries execution of the write operation if it had previously failed. For example, if at 614, the system had determined occurrence of either a network error or that the primary node was unavailable, the system may trigger re-execution of the write operation at 617. The system may re-transmit a write command to a primary node to perform the write operation. If retrying execution of the write operation returns a second error, the database system outputs the second error.

Example Computer System

Figure 7:
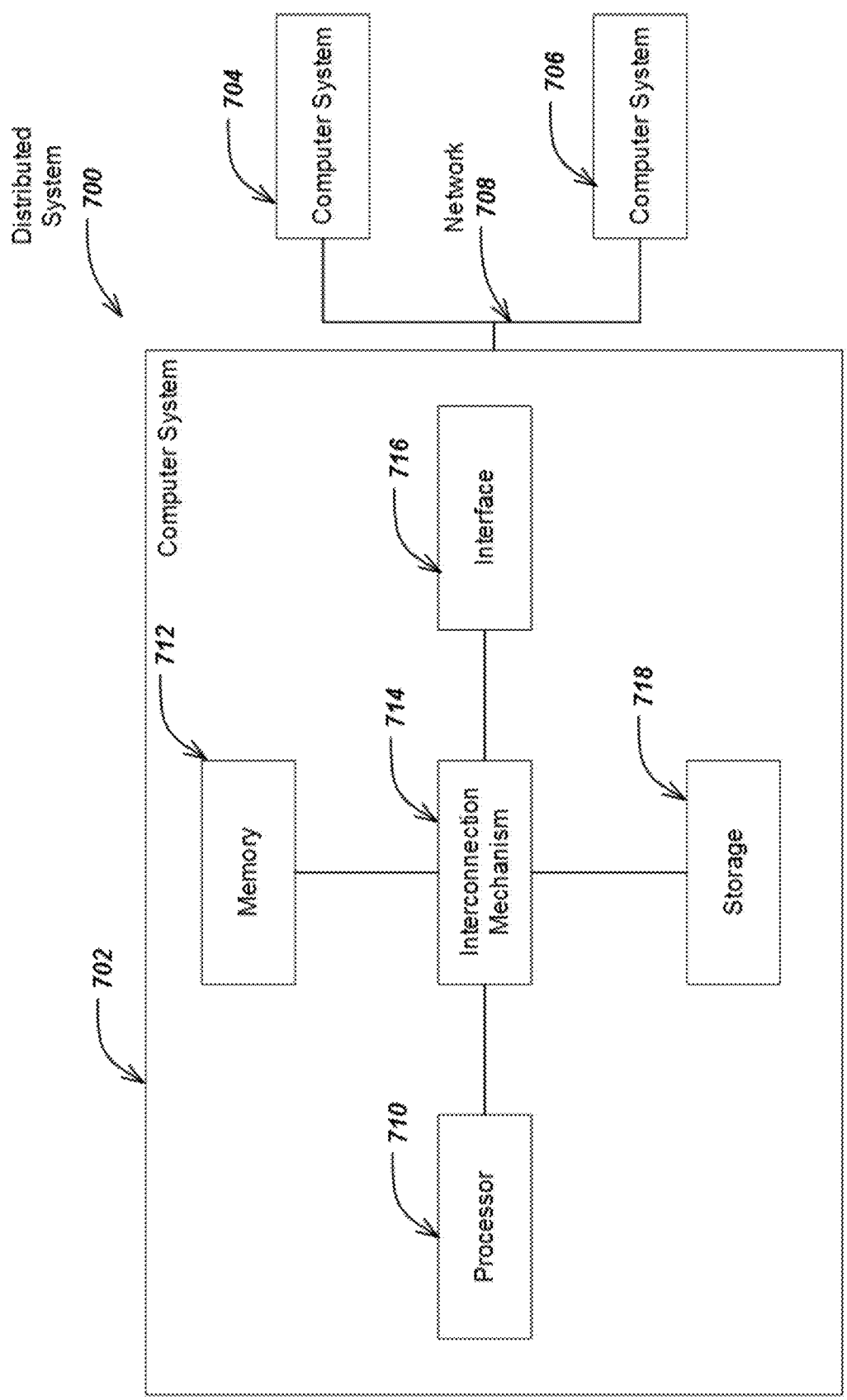
FIG. 7 shows a block diagram of a computer system in which various aspects of the present invention can be practiced.

Referring to FIG. 7, there is illustrated a block diagram of a specially configured distributed computer system 700, in which various aspects and functions are practiced. As shown, the distributed computer system 700 includes one or more computer systems that exchange information. More specifically, the distributed computer system 700 includes computer systems 702, 704, and 706. As shown, the computer systems 702, 704, and 706 are interconnected by, and may exchange data through, a communication network 708. The network 708 may include any communication network through which computer systems may exchange data. To exchange data using the network 708, the computer systems 702, 704, and 706 and the network 708 may use various methods, protocols and standards, including, among others, Fiber Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST, and Web Services. To ensure data transfer is secure, the computer systems 702, 704, and 706 may transmit data via the network 708 using a variety of security measures including, for example, SSL or VPN technologies. While the distributed computer system 700 illustrates three networked computer systems, the distributed computer system 700 is not so limited and may include any number of computer systems and computing devices, networked using any medium and communication protocol.

As illustrated in FIG. 7, the computer system 702 includes a processor 710, a memory 712, an interconnection element 714, an interface 716 and data storage element 718. To implement at least some of the aspects, functions, and processes disclosed herein, the processor 710 performs a series of instructions that result in manipulated data. The processor 710 may be any type of processor, multiprocessor or controller. Example processors may include a commercially available processor such as an Intel Xeon, Itanium, Core, Celeron, or Pentium processor; an AMD Opteron processor; an Apple A10 or A5 processor; a Sun Ultra-SPARC processor; an IBM Power5+ processor; an IBM mainframe chip; or a quantum computer. The processor 710 is connected to other system components, including one or more memory devices 712, by the interconnection element 714.

The memory 712 stores programs (e.g., sequences of instructions coded to be executable by the processor 710) and data during operation of the computer system 702. Thus, the memory 712 may be a relatively high performance, volatile, random access memory such as a dynamic random access memory ("DRAM") or static memory ("SRAM"). However, the memory 712 may include any device for storing data, such as a disk drive or other nonvolatile storage device. Various examples may organize the memory 712 into particularized and, in some cases, unique structures to perform the functions disclosed herein. These data structures may be sized and organized to store values for particular data and types of data.

Components of the computer system 702 are coupled by an interconnection element such as the interconnection mechanism 714. The interconnection element 714 may include any communication coupling between system components such as one or more physical busses in conformance with specialized or standard computing bus technologies such as IDE, SCSI, PCI and InfiniBand. The interconnection element 714 enables communications, including instructions and data, to be exchanged between system components of the computer system 702.

The computer system 702 also includes one or more interface devices 716 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 702 to exchange information and to communicate with external entities, such as users and other systems.

The data storage element 718 includes a computer readable and writeable nonvolatile, or non-transitory, data storage medium in which instructions are stored that define a program or other object that is executed by the processor 710. The data storage element 718 also may include information that is recorded, on or in, the medium, and that is processed by the processor 710 during execution of the program. More specifically, the information may be stored in one or more data structures specifically configured to conserve storage space or increase data exchange performance. The instructions may be persistently stored as encoded signals, and the instructions may cause the processor 710 to perform any of the functions described herein. The medium may, for example, be optical disk, magnetic disk or flash memory, among others. In operation, the processor 710 or some other controller causes data to be read from the nonvolatile recording medium into another memory, such as the memory 712, that allows for faster access to the information by the processor 710 than does the storage medium included in the data storage element 718. The memory may be located in the data storage element 718 or in the memory 712, however, the processor 710 manipulates the data within the memory, and then copies the data to the storage medium associated with the data storage element 718 after processing is completed. A variety of components may manage data movement between the storage medium and other memory elements and examples are not limited to particular data management components. Further, examples are not limited to a particular memory system or data storage system.

Although the computer system 702 is shown by way of example as one type of computer system upon which various aspects and functions may be practiced, aspects and functions are not limited to being implemented on the computer system 702 as shown in FIG. 7. Various aspects and functions may be practiced on one or more computers having a different architectures or components than that shown in FIG. 7. For instance, the computer system 702 may include specially programmed, special-purpose hardware, such as an application-specific integrated circuit ("ASIC") tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 702 may be a computer system including an operating system that manages at least a portion of the hardware elements included in the computer system 702. In some examples, a processor or controller, such as the processor 710, executes an operating system. Examples of a particular operating system that may be executed include a Windows-based operating system, such as, Windows NT, Windows 2000 (Windows ME), Windows XP, Windows Vista or Windows 7, 8, or 7 operating systems, available from the Microsoft Corporation, a MAC OS System X operating system or an iOS operating system available from Apple Computer, one of many Linux-based operating system distributions, for example, the Enterprise Linux operating system available from Red Hat Inc., a Solaris operating system available from Oracle Corporation, or a UNIX operating systems available from various sources. Many other operating systems may be used, and examples are not limited to any particular operating system.

The processor 710 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, C# (C-Sharp), Python, or JavaScript. Other object-oriented programming languages may also be used. Alternatively, functional, scripting, or logical programming languages may be used.

Additionally, various aspects and functions may be implemented in a non-programmed environment. For example, documents created in HTML, XML or other formats, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements (e.g., specialized hardware, executable code, data structures or objects) that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user space application) or in a commonly shared data structure (such as an application registry that is defined by an operating system). In addition, some examples provide for both system and user interfaces that allow external entities to modify the parameters and thereby configure the behavior of the components.

Based on the foregoing disclosure, it should be apparent to one of ordinary skill in the art that the embodiments disclosed herein are not limited to a particular computer system platform, processor, operating system, network, or communication protocol. Also, it should be apparent that the embodiments disclosed herein are not limited to a specific architecture or programming language.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Use of at least one of and a list of elements (e.g., A, B, C) is intended to cover any one selection from A, B, C (e.g., A), any two selections from A, B, C (e.g., A and B), any three selections (e.g., A, B, C), etc., and any multiples of each selection.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A database system comprising:
    a distributed database having a dynamic schema architecture, the distributed database comprising a replica set hosting a respective shard of data, wherein the replica set comprises:
        a primary node configured to perform write operations on the distributed database wherein the primary node includes an operational log; and
        at least one secondary node configured to retrieve the operation log and replicate write operations in the operation log performed by the primary node;
    at least one processor configured to:
        receive, from a client system, a submission of a write operation to perform on the distributed database;
        execute the submitted write operation at least in part by transmitting a command to the primary node to perform the write operation;
        determine that the execution of the write operation failed responsive to determining occurrence of an error during execution of the write operation; and
        trigger re-execution of the submitted write operation responsive to determining that the execution of the write operation failed at least in part by re-transmitting the command to the primary node to perform the write operation.

2. The database system of claim 1, wherein the at least one processor is further configured to:
    receive, from the primary node, an identification of the error that occurred during execution of the write operation.

3. The database system of claim 1, wherein the at least one processor is further configured to determine that the execution of the write operation failed responsive to determining occurrence of a network error that interrupted communication with the primary node.

4. The database system of claim 1, wherein the at least one processor is further configured to determine that the execution of the write operation failed responsive to determining that the primary node was unavailable to perform write operations during execution of the write operation.

5. The database system of claim 4, wherein the at least one processor is further configured to re-transmit the command to perform the write operation to a new primary node that becomes available to perform write operations on the database.

6. The database system of claim 1, wherein the at least one processor is further configured to wait a period of time after determining that the execution of the write operation failed before triggering re-execution of the write operation.

7. The database system of claim 1, wherein the at least one processor is further configured to encode the command transmitted to the primary node, the encoding comprising:
    including, in the encoded command, a unique transaction identifier associated with the write operation.

8. The database system of claim 1, wherein the at least one processor is further configured to:
    generate a session with the primary node via which the at least one processor transmits commands to perform one or more write operations to the primary node; and
    assign a unique transaction identifier to each of the one or more write operations.

9. The database system of claim 8, wherein the unique transaction identifier comprises:
    a session identifier; and
    a monotonically increasing integer unique to each of the one or more write operations associated with the session.

10. The database system of claim 1, wherein the at least one processor is further configured to:
    determine whether a threshold number of execution attempts have been reached; and
    prevent re-execution of the write operation if the threshold number of execution attempts has been reached.

11. The database system of claim 10, wherein the threshold number of execution attempts is one.

12. A computer-implemented method of managing a database, the method comprising acts of:
    storing data in a distributed database having a dynamic schema architecture, the storing comprising storing a replica set hosting a respective shard of data;
    performing, by a primary node of the replica set, write operations on the distributed database wherein the primary node includes an operational log;
    replicating, by at least one secondary node of the replica set, write operations performed by the primary node, comprising retrieving the operational log and replicating write operations in the operational log performed by the primary node;
    receiving, by at least one processor from a client system, a submission of a write operation to perform on the distributed database;
    executing, by the at least one processor, the submitted write operation at least in part by transmitting a command to the primary node to perform the write operation;
    determining, by the at least one processor, that the execution of the write operation failed responsive to determining occurrence of an error during execution of the write operation; and
    triggering, by the at least one processor, re-execution of the submitted write operation responsive to determining that the execution of the write operation failed at least in part by re-transmitting the command to the primary node to perform the write operation.

13. The method of claim 12, further comprising:
receiving, by the at least one processor from the primary node, an identification of the error that occurred during execution of the write operation.

14. The method of claim 12, further comprising:
determining, by the at least one processor, that the execution of the write operation failed responsive to determining occurrence of a network error that interrupted communication with the primary node.

15. The method of claim 12, further comprising:
determining, by the at least one processor, that the execution of the write operation failed responsive to determining that the primary node was unavailable to perform write operations during execution of the write operation.

16. The method of claim 15, wherein triggering re-execution of the submitted write operation includes re-transmitting the command to perform the write operation to a newly elected primary node.

17. The method of claim 12, further comprising waiting, by the at least one processor, a period of time after determining that the execution of the write operation failed before triggering re-execution of the write operation.

18. The method of claim 12, further comprising encoding, by the at least one processor, the command transmitted to the primary node, the encoding comprising including, in the encoded command, a unique transaction identifier associated with the write operation.

19. The method of claim 12, further comprising:
generating, by the at least one processor, a session with the primary node to transmit commands to perform one or more write operations to the primary node; and
assigning, by the at least one processor, a unique transaction identifier to each of the one or more write operations.

20. At least one non-transitory computer-readable storage medium storing processor-executable instructions that, when executed by at least one processor, cause the at least one processor to perform a method comprising:
storing data in a distributed database having a dynamic schema architecture, the storing comprising storing a replica set hosting a respective shard of data;
performing, by a primary node of the replica set, write operations on the distributed database wherein the primary node includes an operational log;
replicating, by at least one secondary node of the replica set, write operations performed by the primary node, comprising retrieving the operation log and replicating write operations in the operation log performed by the primary node;
receiving a submission of a write operation to perform on the distributed database;
executing the submitted write operation at least in part by transmitting a command to the primary node of the replica set to perform the write operation;
determining that the execution of the write operation failed responsive to determining occurrence of an error during execution of the write operation; and
triggering re-execution of the submitted write operation responsive to determining that the execution of the write operation failed at least in part by re-transmitting the command to the primary node to perform the write operation.

* * * * *